(12) United States Patent
Giles

(10) Patent No.: US 11,868,421 B1
(45) Date of Patent: **\*Jan. 9, 2024**

(54) SYSTEM AND METHOD FOR EVALUATING HYPERDOCUMENTS USING A TRAINED ARTIFICIAL NEURAL NETWORK

(71) Applicant: Ellis Robinson Giles, Houston, TX (US)

(72) Inventor: Ellis Robinson Giles, Houston, TX (US)

( \* ) Notice: Subject to any disclaimer, the term of this patent is extended or adjusted under 35 U.S.C. 154(b) by 1605 days.

This patent is subject to a terminal disclaimer.

(21) Appl. No.: 16/012,745

(22) Filed: Jun. 19, 2018

Related U.S. Application Data

(63) Continuation-in-part of application No. 29/604,162, filed on May 15, 2017, now abandoned, and a continuation-in-part of application No. 14/537,892, filed on Nov. 10, 2014, now abandoned, said application No. 29/604,162 is a continuation-in-part of application No. 29/473,915, filed on Nov. 26, 2013, now abandoned, which is a continuation-in-part of application No. 12/984,594, filed on Jan. 4, 2011, now Pat. No. 8,595,163, said application No. 14/537,892 is a continuation of application No. 12/497,543, filed on Jul. 2, 2009, now abandoned, said application No. 12/984,594 is a continuation-in-part of application No. 12/103,446, filed on Apr. 15, 2008, now Pat. No. 7,865,453, which is a continuation of application No. 11/187,126, filed on Jul. 22, 2005, now Pat. No. 7,403,929.

(60) Provisional application No. 61/133,740, filed on Jul. 2, 2008, provisional application No. 60/590,812, filed on Jul. 23, 2004.

(51) Int. Cl.

| | |
|---|---|
| G06F 7/00 | (2006.01) |
| G06F 16/955 | (2019.01) |
| G06N 3/02 | (2006.01) |
| G06F 16/9535 | (2019.01) |

(52) U.S. Cl.
CPC ...... G06F 16/9558 (2019.01); G06F 16/9535 (2019.01); G06N 3/02 (2013.01)

(58) Field of Classification Search
CPC .... G06F 16/9558; G06F 16/9535; G06N 3/02
See application file for complete search history.

(56) References Cited

U.S. PATENT DOCUMENTS

| | | | | |
|---|---|---|---|---|
| 5,187,592 | A * | 2/1993 | Sugiyama | H04N 1/405 358/426.12 |
| 5,608,819 | A * | 3/1997 | Ikeuchi | G06V 30/413 382/176 |
| 6,085,224 | A * | 7/2000 | Wagner | H04L 67/306 709/219 |
| 6,198,843 | B1 * | 3/2001 | Nakauchi | H04N 1/6058 358/518 |
| 8,239,445 | B1 * | 8/2012 | Gage | H04L 9/40 709/217 |

(Continued)

Primary Examiner — Mohammed R Uddin

(57) ABSTRACT

An embodiment of a system for determining the disposition of a hyperdocument and hyperdocument requests using a trained artificial neural network, including an information source, a requesting application, and a server containing a trained artificial neural network (ANN), the ANN being capable of evaluating the information, and providing results reflecting the evaluation to a requesting application is described.

20 Claims, 27 Drawing Sheets

(56) References Cited

U.S. PATENT DOCUMENTS

| | | | | |
|---|---|---|---|---|
| 2003/0009495 | A1* | 1/2003 | Adjaoute | G06F 40/247 |
| | | | | 715/255 |
| 2003/0182420 | A1* | 9/2003 | Jones | H04L 63/0245 |
| | | | | 709/224 |
| 2004/0073811 | A1* | 4/2004 | Sanin | H04L 63/0263 |
| | | | | 726/13 |
| 2006/0253458 | A1* | 11/2006 | Dixon | H04L 63/1483 |

* cited by examiner

Given a request for hypermedia request h, comprising a URI *uri*
and a possible cookie *c*:

*L* is a list of safe search supported locations, and for each
location *loc* in *L*, there is a search path *p*, safe search flag *f*,
and safe cookie flag *k*, where *k* or *f* can be empty.

extract root domain *d* from host part of *uri*
if *d* is in a list of safe only search sites then
  return
if *d* is in the "Always Block" list then
  modify *uri* to point to a blocked site
else if *d* is in a list of non-safe search sites then
  modify *uri* to point to safe search site or blocked site
else if *d* is in the list of safe search supported sites *L* then
  retrieve search path *p*
  retrieve safe search flag *f* from *L* for *d*
  retrieve safe search cookie flag *k* from *L* for *d*
  if *uri* path contains *p* then
    if *f* is not empty and *uri* path does not contain *f* then
      modify *uri* to contain *f*
    else if *c* does not contain *k* then
      modify *c* to contain *k*
  else if *uri* path contains a possible search query
  by comparing to a list of likely query paths then
    modify *uri* to point to safe search site or blocked site

FIG. 18

```
If (URI Host Root Domain is a safe only search site)
        return;
// If request is for a blocked site, then block or redirect request.
If (URI Host Root Domain in "Always Block" list)
{
        URI = "http://www.redirect.com/blocked.html";
}
// If request is for an unsupported, known site, redirect request.
Else If (URI Host Root Domain == example3.com)
{
        URI = "http://www.redirect.com/s?q=" + search terms;
}
// If request is a supported safe search site, then insure safe is on.
If (URI Host Root Domain == "example.com")
{
        If (URI path contains "search")
        {
                If (URI does not contain "&safe=on")
                {
                        URI = URI + "&safe=on";
                }
                else If (no cookie for example.com that contains "safe=on")
                {
                        Set Cookie for example2.com to "safe=on";
                }
        }
}
// If a request looks like it is for an unknown site, it can be redirected.
Else If (URI path contains "query")
{
        URI = "http://www.example.com/search?safe=on&q=" +
                search terms;
        // Or redirected to a blocked page.
}
```

FIG. 19

| Level | Threshold | Good Accuracy | Bad Accuracy | Rule | | | |
|---|---|---|---|---|---|---|---|
| 10 | 0 | 0 | 1 | All Images Blocked | | | |
| 9 | 0.19 | 0.69 | 0.956 | Bad Accuracy: | 0.962867 | Maximize good accuracy in bad range – from: 0.952867 | to 0.972867 |
| 8 | 0.34 | 0.753 | 0.925 | Bad Accuracy: | 0.925333 | Maximize good accuracy in bad range – from: 0.915333 | to 0.935333 |
| 7 | 0.48 | 0.801 | 0.888 | Maximum Accuracy | | | |
| 6 | 0.6 | 0.838 | 0.836 | Equal Good and Bad Accuracy | | | |
| 5 | 0.72 | 0.881 | 0.747 | Good Accuracy: | 0.865 | Maximize bad accuracy in good range – from: 0.855 | to 0.875 |
| 4 | 0.77 | 0.901 | 0.699 | Good Accuracy: | 0.892 | Maximize bad accuracy in good range – from: 0.882 | to 0.902 |
| 3 | 0.81 | 0.919 | 0.636 | Good Accuracy: | 0.919 | Maximize bad accuracy in good range – from: 0.909 | to 0.929 |
| 2 | 0.85 | 0.95 | 0.451 | Good Accuracy: | 0.946 | Maximize bad accuracy in good range – from: 0.936 | to 0.956 |
| 1 | 0.9 | 0.976 | 0.251 | Good Accuracy: | 0.973 | Maximize bad accuracy in good range – from: 0.963 | to 0.983 |
| 0 | 1 | 1 | 0 | No Images Blocked | | | |
| | | | | 0.0973333 | Increments for Bad Accuracy | | |
| | | | | 0.027 | Increments for Good Accuracy | | |

FIG. 31

SYSTEM AND METHOD FOR EVALUATING HYPERDOCUMENTS USING A TRAINED ARTIFICIAL NEURAL NETWORK

REFERENCE TO RELATED APPLICATIONS

This application is a continuation-in-part of and claiming the benefit of U.S. patent application Ser. No. 29/604,162 filed May 15, 2017, which is a continuation-in-part of and claiming the benefit of U.S. patent application Ser. No. 29/473,915 filed on Nov. 26, 2013, which is a continuation-in-part of and claiming the benefit of U.S. patent application Ser. No. 12/984,594 filed on Jan. 4, 2011 entitled "System for Evaluating Hyperdocuments Using a Trained Artificial Neural Network," and U.S. patent application Ser. No. 12/984,594 is herein incorporated by reference. The U.S. patent application Ser. No. 12/984,594, which issued as U.S. Pat. No. 8,595,163 on Nov. 26, 2013, claims the benefit of U.S. patent application Ser. No. 12/103,446 filed on Apr. 15, 2008, issued as U.S. Pat. No. 7,865,453 on Jan. 4, 2011, and entitled "Apparatus and Methods for Evaluating Hyperdocuments Using a Trained Artificial Neural Network," which claims the benefit of U.S. patent application Ser. No. 11/187,126 filed on Jul. 22, 2005, issued as U.S. Pat. No. 7,403,929 on Jul. 22, 2008, and entitled "Apparatus and Methods for Evaluating Hyperdocuments Using a Trained Artificial Neural Network," which claims the benefit of U.S. Provisional Patent Application Ser. No. 60/590,812 filed Jul. 23, 2004 and entitled "Method For Selective Categorizations Of Content Within Hyperdocuments Using Artificial Neural Networks." This application is also a continuation-in-part of and claiming the benefit of pending U.S. patent application Ser. No. 14/537,892, herein incorporated by reference, filed Nov. 10, 2014, entitled "System and Method for Forcing Safe Hypermedia Search Requests Using Dynamically Updated Routing Logic," which is a continuation of and claiming the benefit of pending U.S. patent application Ser. No. 12/497,543 filed Jul. 2, 2009, entitled "System and Method for Forcing Safe Hypermedia Search Requests Using Dynamically Updated Routing Logic," which claims the benefit of U.S. Provisional Application Ser. No. 61/133,740 filed Jul. 2, 2008, entitled "System and Method for Forcing Safe Hypermedia Search Requests Using Dynamically Updated Routing Logic".

ACKNOWLEDGMENT OF GOVERNMENT SUPPORT

Not Applicable

BACKGROUND OF THE INVENTION

The present invention relates to a system and method for evaluating and modifying hypedocuments, also hypermedia documents, and hypermedia requests with the use of at least one trained artificial neural network.

Hypermedia is retrieved for viewing and/or other use through network connections, file transfers, disk drives or other sources of information. Hypermedia is the combination of media, including video, graphic images, and sound, text, hyperlinks and other elements in the form of documents or web documents. As used in this patent, the term "hypermedia" means at least one electronically-accessible or readable document, data, image or file, a portion or combination thereof, or a copy thereof. For example, hypermedia may be information in the form of hypertext, images, video, sound, text, or phrases, or a combination of such forms of information, displayed or retrieved as a web page, file, electronic communication or other form of media. A hypermedia document, or "hyperdocument," as referred to in this patent, may be a document or web page that includes or points to multiple images, text, video, etc., a compilation of hyperdocument files, or a compressed or archived file (e.g. ZIP, TAR, etc.), that contains one or more hyperdocuments.

Hypertext is a form of hypermedia that is text linked together in which the user can browse through related or linked topics. Hypermedia is retrieved over the Internet in many different ways. These ways include, but are in no way limited to, Hypertext Transfer Protocol (HTTP), Hypertext Transfer Protocol Secure (HTTPS), File Transfer Protocol (FTP), and other methods including user implemented methods for retrieving hypermedia. HTTP is the protocol used to send requests from a browser or other web-based application to a web server and to transport pages or resulting documents, including hypermedia, from web servers back to the requesting browser or web-based application.

Hypermedia requests can be in the form of, but not limited to, a Uniform Resource Identifier (URI) or a Uniform Resource Locator (URL) with optional additional information such as a cookie, database request, or file request at the network or operating system level. A URI is a character string used to identify a resource from a local machine, network attached machine or anywhere on the Internet by type and location. The set of URIs include Uniform Resource Names (URNs) and Uniform Resource Locators (URLs). URLs are used to locate Internet resources by a web browser or web-based application. A cookie is a block of data that a web server stores on a client system in response to a request from the client which is sent back to the web server when the user returns to the same site. A cookie normally consists of name value pairs and is used to identify users, instructing the web server to send a customized version of a document.

Often, it is desirable or necessary to evaluate, or review, hypermedia and hypermedia requests for any number of reasons. For example, it may be desirable to evaluate hypermedia and hypermedia requests to determine if it should be provided to one or more users or other destinations for viewing, display, saving, download or another use. For other examples, hypermedia is often evaluated for security screening, virus scanning or filtering for, spam or other content. As used in this patent, the term "user" means at least one person, software routine, hardware component, system, designated recipient of hypermedia or any other entity or a combination thereof.

Present hyperdocument and hypermedia request evaluation systems have various limitations. For example, in the field of hypermedia filtering, typical existing systems are based upon look-up tables or the like. Some examples of commercially available systems are Norton Anti-Virus, Net Nanny and AOL Parental Controls. These systems search the hypermedia for certain text words or phrases that are compared to text words or phrases maintained in a database. For another example, in hypermedia request comparison systems, the source address of the hypermedia requested is typically compared to a list of known sources, addresses or other identifiers. Content that should be filtered might be located in an otherwise non-filtered site such as a website community. For another example, hypermedia requests can be obfuscated, or changed, redirected or sent and/or received, or by a proxy, through another system. For another example, existing text or HTML-based language filters must maintain a list of words or phrases to be blocked. To stay current, the lists must be updated for changing sources or sites, new sources or data, etc. Other applications simply block a URL or IP address or modify resulting hypertext returned from a request. Other presently available systems utilize contour transformation, context boundary analysis, templates for categorizing specific hypertext and pixel comparisons for color images. An example of existing image comparison software is ScreenShield by Guardware, Inc., which compares hyperdocument pixel color to a skin tones database.

The ability of typical existing systems to evaluate hypermedia documents, or hyperdocuments, is thus limited to the text, phrases, images or other data entered into and maintained in a database. To stay current, the lists must be updated for changing sources or sites, new sources or data, etc. Known systems utilizing contour transformations or boundary analysis are limited to specific criteria previously established for the system.

Another limitation of present hypermedia evaluation systems and hypermedia request evaluation systems are that new hypermedia that would potentially be blocked or filtered is listed on Internet search engines daily. Searching the World Wide Web began as early as 1993 with the first Web search engine Wandex, a web crawler. The Internet now contains thousands of search and specialty search engines. It is increasingly difficult to track, maintain, and create rules and logic for an evaluation system that would capture each new blocked or filtered search result for each search engine. Some search engines, like Yahoo and Google offer users the ability to perform a "safe search." This is a web search that filters out potentially harmful or offensive material as determined by the individual search engine. The web search engine tracks the user preferences by appending a code to the end of the URI and/or adding a property to a cookie that is set by the web server to instruct the server on further requests to send a customized version of the requested document, in this case a filtered search result. However, not only does just a few of the thousands of Internet and specialty search engines offer this feature, but the feature can easily be turned off with just a mouse click by a user searching the Internet. By forcing searches to be safe, the chance of finding or running across harmful material is reduced. In the same manner, URIs, which include URLs and local file requests, need to be evaluated and routed or redirected to protect users from confidential material, restricted access documents, or other files or documents.

It should be understood, however, that the above discussion is only exemplary of existing technology and its limitations. The existing technology has other limitations. Further, each embodiment of the present invention and each claim of this patent does not necessarily address or solve the above-described or any particular limitations or disadvantages of existing technology and is otherwise not limited in any way by the above discussion.

Accordingly, there exists a need for a system for evaluating hypermedia documents, or hyperdocuments, and hypermedia requests having one or more of the following attributes, capabilities or features: uses trained artificial neural network technology for hypermedia evaluation; uses trained artificial neural network technology for evaluation of images; uses trained artificial neural network technology for evaluation of pornographic content in hypermedia; transforms electronic image data into a format useful by an artificial neural network for hypermedia analysis; evaluates and selectively categories hyperdocuments based upon artificial neural network analysis; allows for selective categorizations of content within hyperdocuments; evaluates the accuracy of hypermedia retrieval; allows hypermedia retrieval based upon a sliding scale associated with specific criteria; selectively allows retrieval of information from within hyperdocuments; provides hypermedia retrieval control based upon the categorization of the hypermedia or content within; allows user-selected criteria for hypermedia retrieval; provides flexibility in hypermedia retrieval; categorizes the hyperdocuments, such as images, rather than merely inspecting text or phrases; evaluates the actual hypermedia content, not merely its address, description or reference; is not limited to a comparison list or database; does not rely upon maintenance of a comparison list or database; does not depend on the selection criteria imposed by the system; includes a timeout function; or any combination thereof.

Furthermore, there exists a need for a system and method for forcing safe hypermedia search requests having one or more of the following attributes, capabilities or features: uses dynamic updates to maintain routing logic for routing search requests; updates lists of blocked search engines that do not support safe searches; updates lists of search engines that support safe searches; maintains logic to convert non-safe searches to safe searches on supported search engines; can query a different server to perform routing logic on hypermedia requests; dynamically updates conversion logic for routing, redirecting, or modifying hypermedia requests; updates hypermedia request redirection logic asynchronously or synchronously; can update hypermedia request redirection logic with an asynchronous push of an update; on non-safe search supported engines, can route or redirect hypermedia requests to a safe search engine; can block certain search requests altogether; can determine if a hypermedia request is a search even if it is on an unknown site; can filter requests before they are sent to a search engine; can selectively remove certain search terms from a search before they are requested from a search engine; can force a safe search by appending a safe search flag; can force a safe search by appending or modifying or creating a user cookie; can force a safe search by appending a flag and modifying or creating a user cookie; can return the original page, a redirected page, or an altered page; can return a redirected page if it is another search engine, a blocked page, or a modified request; can modify requests to non Internet search engines, such as, but not limited to, documents on a computer, server, database, or other connection.

BRIEF SUMMARY OF THE INVENTION

Various embodiments of the present invention involve a computer-implemented method for determining the disposition of a hypermedia document, or hyperdocument. The method includes retrieving a hyperdocument from an information source and providing information about content of the hyperdocument to a trained artificial neural network. The trained artificial neural network is capable of evaluating the information and providing results reflecting the evaluation. The disposition of the hyperdocument is determined based upon results of the trained artificial neural network.

If desired, the results of the artificial neural network evaluation may be compared to at least one user-designated selection criteria. The method may include categorizing the hyperdocument into one among multiple categories based upon the evaluation of the artificial neural network. The category level of the artificial neural network results may be compared with a desired category level.

In some embodiment, the invention involves a computer-implemented method for evaluating hyperdocument images, including retrieving a hyperdocument from an information source based upon a request from a requesting application. Information about one or more images of the hyperdocument is provided to a trained artificial neural network, the trained artificial neural network being capable of evaluating the information and providing results reflecting the evaluation. The disposition of the hyperdocument image(s) is determined based upon results of the trained artificial neural network, such disposition including at least one among modifying the hyperdocument and providing the modified hyperdocument to the requesting application or other destination, providing the original hyperdocument to the requesting application or other destination and providing a replacement hyperdocument to the requesting application or other destination.

There are embodiments of the present invention involve a computer-implemented method for filtering content of a hyperdocument that includes a user selecting criteria for allowable hyperdocuments. A hyperdocument is received from an information source based upon a request from a requesting application. Information about content of the hyperdocument is provided to a trained artificial neural network, the trained artificial neural network being capable of analyzing the information and providing results reflecting the analysis. Based upon the artificial neural network results, hyperdocument is provided to the requesting application if it matches the user selected criteria.

In addition to evaluating the hypermedia documents, hyperdocuments, using an analysis system, containing an artificial neural network, various embodiments of the present invention involve a computer-implemented method for evaluating requests for hypermedia according to user selectable criteria and returning the requested or other hypermedia. The method includes receiving a request for hypermedia from a requesting application and providing information about the request to an analysis system. The analysis system is capable of evaluating the hypermedia request and modifying the request. The analysis system and logic therein can be updated dynamically to provide the most up to date analysis possible. The disposition of the hypermedia request is determined based upon results of the analysis system. The resulting hypermedia request is performed and the resulting hypermedia, which may include all, some or none of the originally requested hypermedia, is returned to the requesting application.

In some embodiments, hypermedia requests for hypermedia files either on the local machine or on an attached device or through a network connection or other device can be analyzed and resulting hypermedia can be provided to a requesting application. Local documents can be specified by a URI or be accessed through an operating system file access method. These requests can be intercepted by the invention, analyzed, and the hypermedia request can be modified and the resulting hypermedia is returned. In routing requests for hypermedia, protection can be provided for inappropriate content or personal or confidential files.

The invention involves a computer-implemented method for forcing safe Internet searches; including receiving a hypermedia request for an Internet search. Information contained in the hypermedia request is provided to a hypermedia request analysis system. The disposition of the hypermedia request is determined based upon results of the hypermedia request analysis system, such disposition including either modifying the hypermedia request or providing the original hypermedia request. The resulting hypermedia request is performed and the resulting hypermedia is returned to the requesting application. The hypermedia request analysis system is dynamically updated to ensure the latest rules are implemented. The logic included in the analysis system is updated, which includes lists of blocked sites, unsafe Internet search engines, safe settings for supported search engines, and other logic. Information regarding the hypermedia request that is passed to the hypermedia request analysis system can contain, but is not limited to, user settings, URI or URL, browser cookies, and/or metadata, or data describing data such as size, subject, or location of data. The URI or URL and/or cookies can be modified as to redirect or route a hypermedia request to a desired location. The resulting hypermedia is returned. In forcing safe Internet searches, a hypermedia request is analyzed to make sure that, if the request is for an Internet search, e.g. by comparing to known search engines, that the hypermedia request contains appropriate properties, such as values in the path or the URL or URI or values in any cookies passed to the hypermedia request analysis, that a check is made to see if the Internet search is for a safe search. If the Internet search is not for a safe search, then an appropriate flag or character string is added to the URI or URL, or added or created in a cookie, or the URI or URL is routed or modified in such a manner as to either make the Internet search safe or blocked.

Accordingly, the present invention includes features and advantages which are believed to enable it to advance hypermedia documents, hyperdocuments, and hypermedia request evaluation technology. The characteristics and advantages of the present invention described above and additional features and benefits will be readily apparent to those skilled in the art upon consideration of the following detailed description of preferred embodiments and in referring to the accompanying drawings.

BRIEF DESCRIPTION OF THE DRAWINGS

For a detailed description of preferred embodiments of the invention, reference will now be made to the accompanying drawings wherein:

FIG. 18 is an embodiment of example pseudo-code that can be used for hypermedia request analysis;

FIG. 19 is an embodiment of example logic that can be used for hypermedia request analysis;

FIG. 31 is a chart showing example accuracy data and threshold values for example hyperdocument analysis category levels used in connection with an embodiment of a hyperdocument evaluation system in accordance with the present invention;

DETAILED DESCRIPTION OF THE INVENTION

Figure 1:
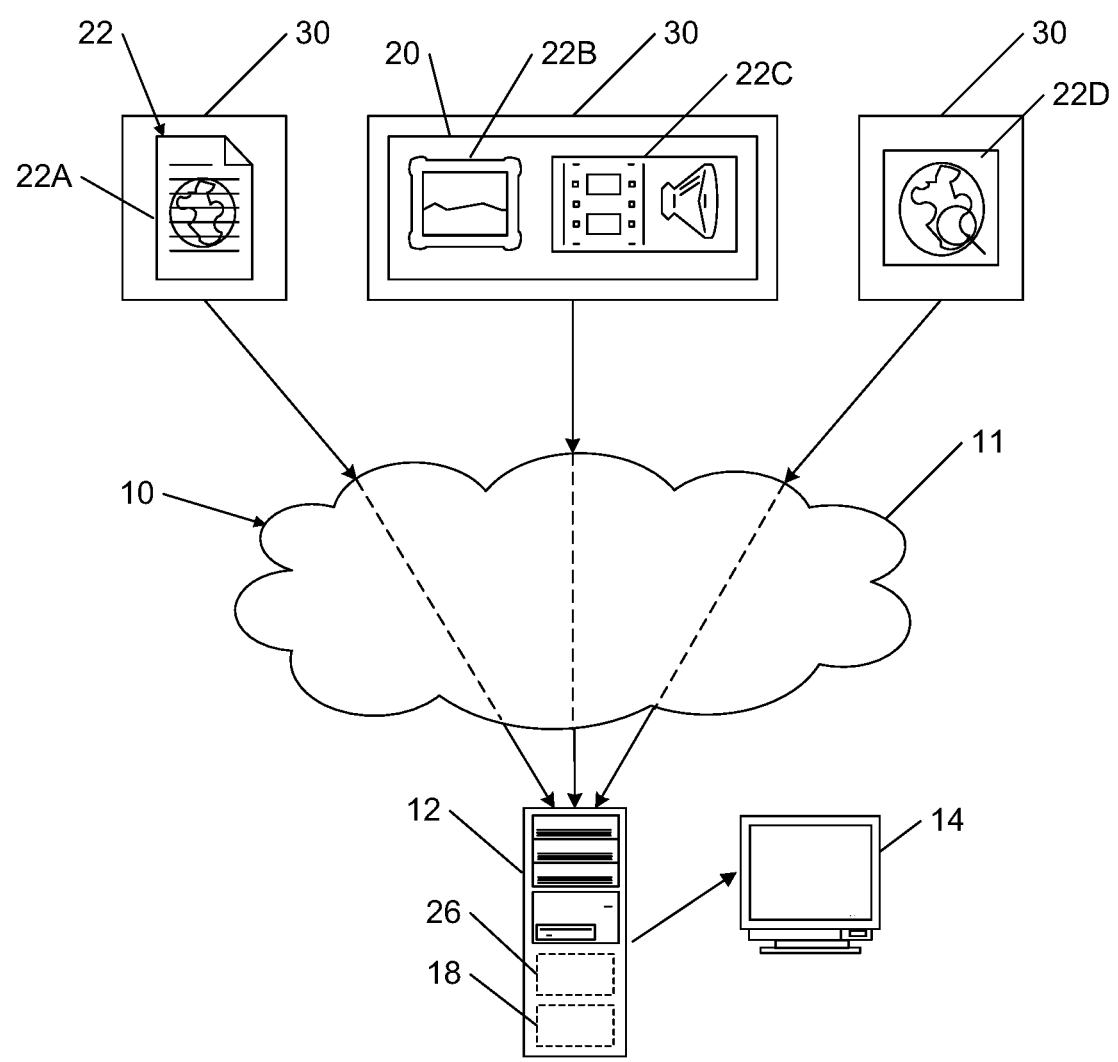
FIG. 1 is a system diagram including an embodiment of a hyperdocument evaluation system, also showing hypermedia request routing system in accordance with the present invention.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

It should be understood that the contents of this patent and the appended Figures are not intended and should not be deemed to limit the scope or construction of any of the appended claims or claim language. Furthermore, as used herein and throughout the various portions of this patent specification, the terms "invention", "present invention" and variations thereof are not intended to mean the claimed invention of any particular of the appended claim or claims, or all of the appended claims. Instead, these terms should be construed to refer merely to a possible embodiment of the present invention. Thus, the use herein of the terms "invention", "present invention" and variations thereof should not limit the construction or scope of the appended claims.

As used throughout this patent, the term "computer" and variations thereof mean a machine or device that can follow instructions to alter data in a desirable way to perform at least some operations without human intervention. The term "program" means a sequence of computer instructions, and an "application" is a "program" designed to assist in a specific task. A "system" is a set of components working together to perform a task.

FIG. 1 is a system diagram showing a network 10 including an embodiment of a hypermedia request routing system ("HRRS") 18 in accordance with the present invention. Note that a hyperdocument evaluation system ("HES") 18 is described later, and its relationship is similarly described. The exemplary HRRS 18 is in communication with at least one requesting application 26 and is coupled to the network 10. For example, the HRRS 18 and requesting application 26 may be computer software located on a data retrieval device, such as a computer 12. Hypermedia 22 (or copies thereof) located at one or more information sources 30 are accessible to the HRRS 18 or requesting application via the network 10. The illustrated network 10 is the Internet or World Wide Web 11, the structure and operation of which is generally known. However, the HRRS 18 of the present invention is not limited to use over the Internet, but may be used in connection with any other communication or data exchange system capable of allowing the HRRS 18 access to hypermedia 22 or copies thereof. Some examples of other types of suitable networks are large area networks, wide area networks, value-added networks and TCP/IP networks. For another example, the computer 12 of FIG. 1 may be a television set that scans requests for video data (e.g. video multimedia data 22C), from a broadcast source 30, such as a television station or cable provider, along a broadcast route 10, such as airwaves or a cable network. Alternately, the HRRS 18 need not be used over a network, such as when the hypermedia is available to the HRRS 18 on a private network, local drive or media storage device.

Generally, information sources may be any locations accessible by the HRRS 18 or requesting application 26, such as databases, files, directories and file transfer or information storage devices. The information sources 30 of the example of FIG. 1 may be any location accessible over the network 10, such as electronic files stored on a PC or server (not shown).

Some examples of hypermedia 22 that may be requested over the network 10 in FIG. 1 are web pages 22A, files 20 that contain hypermedia 22 (e.g. graphics files 22B and multimedia file 22C), and search results 22D in the form of web pages or other media (e.g. XML, data, text, binary data, or other methods of presenting search results). The requesting application 26 may be any suitable information retrieval system, software, hardware or other mechanism capable of requesting hypermedia 22 and with which the HRRS 18 may communicate. In the example shown, the requesting application 26 is web browser software running on the computer 12. However, it should be understood that the present invention is not limited by the type, format, functionality or other characteristic of the hypermedia, hypermedia request, information source or requesting application.

Hypermedia is the combination of media, including video, graphic images, and sound, text, hyperlinks and other elements in the form of web documents. As used in this patent, the term "hypermedia" means at least one electronically-accessible or readable document, data, image or file, a portion or combination thereof, or a copy thereof. For example, hypermedia may be information in the form of hypertext, images, video, sound, text, or phrases displayed or retrieved as a web page, file, electronic communication or other form of media. Hypertext is a form of hypermedia that is text linked together in which the user can browse through related or linked topics.

The HRRS 18 may take any form of any combination of software and/or hardware capable of evaluating, modifying and routing hypermedia requests with the use of updatable logic and communicating with one or more requesting applications 26, and may be at any desired physical location or locations. For example, the HRRS may be software residing on a content server coupled with a web server, numerous servers, a PC in communication with a server, a computer running browser software coupled to the network 10 via a wide area network, a mainframe computer, a network device, a personal data assistant, a laptop computer, a hand-held device coupled to the network 10 via a wireless network, a point of presence (POP) device, a network-enabled telephone, an interactive or network-enabled television or any other suitable device(s) as is or becomes known, or a combination thereof. For another example, the HRRS may be implemented in a hardware device such as a television set, add-on computer board, network-enabled telephone, or hardware network device. If desired, the HRRS 18 may be allocated at one or more nodes (not shown), distributed on an intelligent network, or allocated in any other suitable configuration. Depending upon the particular deployment of the HRRS 18, the overall communication link character connection topology and other communication link characteristics may differ.

The HRRS 18 or components thereof may be built into the requesting application 26, such as a specialized web browser, application server, web server, or proxy server, or an add-on to the requesting application 26, electronically transmittable, such as by download over the network 10, embedded on a diskette (not shown), CD (not shown), magnetic tape (not shown) or any other suitable media. It should be understood, however, that the present invention is not limited in any way by the above examples of formats, locations and configurations of the HRRS 18.

Still referring to FIG. 1, in accordance with an embodiment of a method of the present invention, the request for hypermedia by the requesting application 26 is provided to the HRRS 18. Using redirection logic, that may be dynamically updated, the HRRS 18 evaluates at least some of the request for the hypermedia 22 to determine whether such request should be modified, replaced, or kept in original form. The resulting request for hypermedia is then performed, and the resulting hypermedia 22 is provided to the requesting application 26 (such as for display on a monitor 14), or any other desired destination(s).

Figure 2:
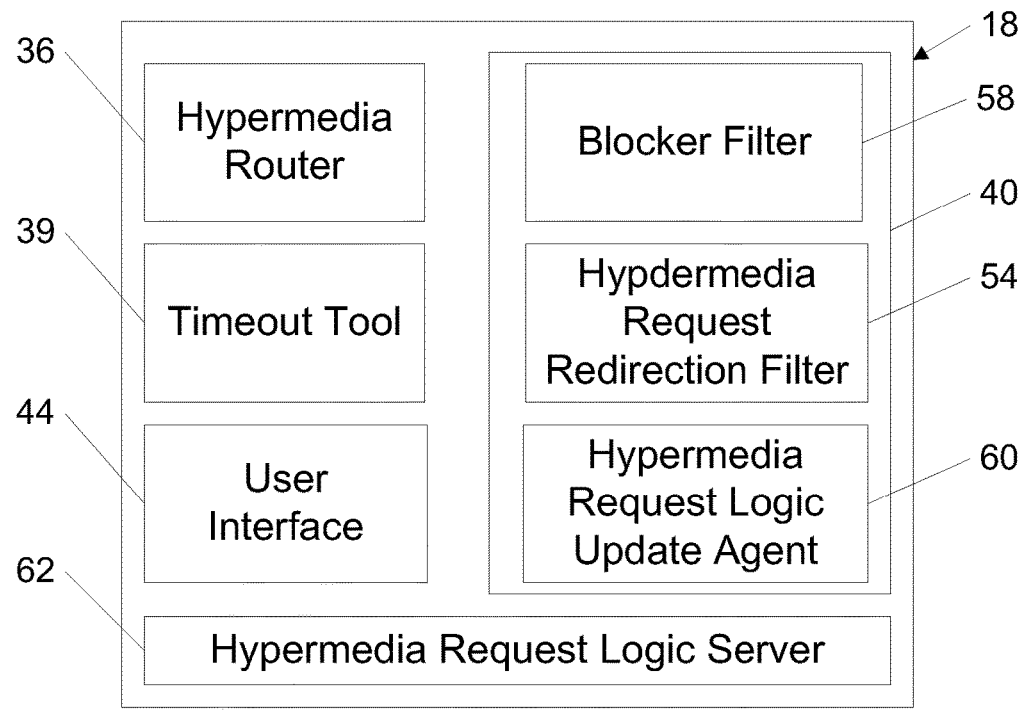
FIG. 2 is a block diagram illustrating various components of an embodiment of a hypermedia request routing system in accordance with the present invention.

Now referring to FIG. 2, the HRRS 18 may include any desired component or components. In the example shown, the HRRS includes a hypermedia routing tool 36, timeout tool 39, user interface 44, hypermedia request analysis system 40, and a hypermedia request logic server 62. The illustrated hypermedia request analysis system 40 includes a hypermedia request redirection filter 54, a blocker filter 58, and hypermedia request logic update agent 60.

Figure 10:
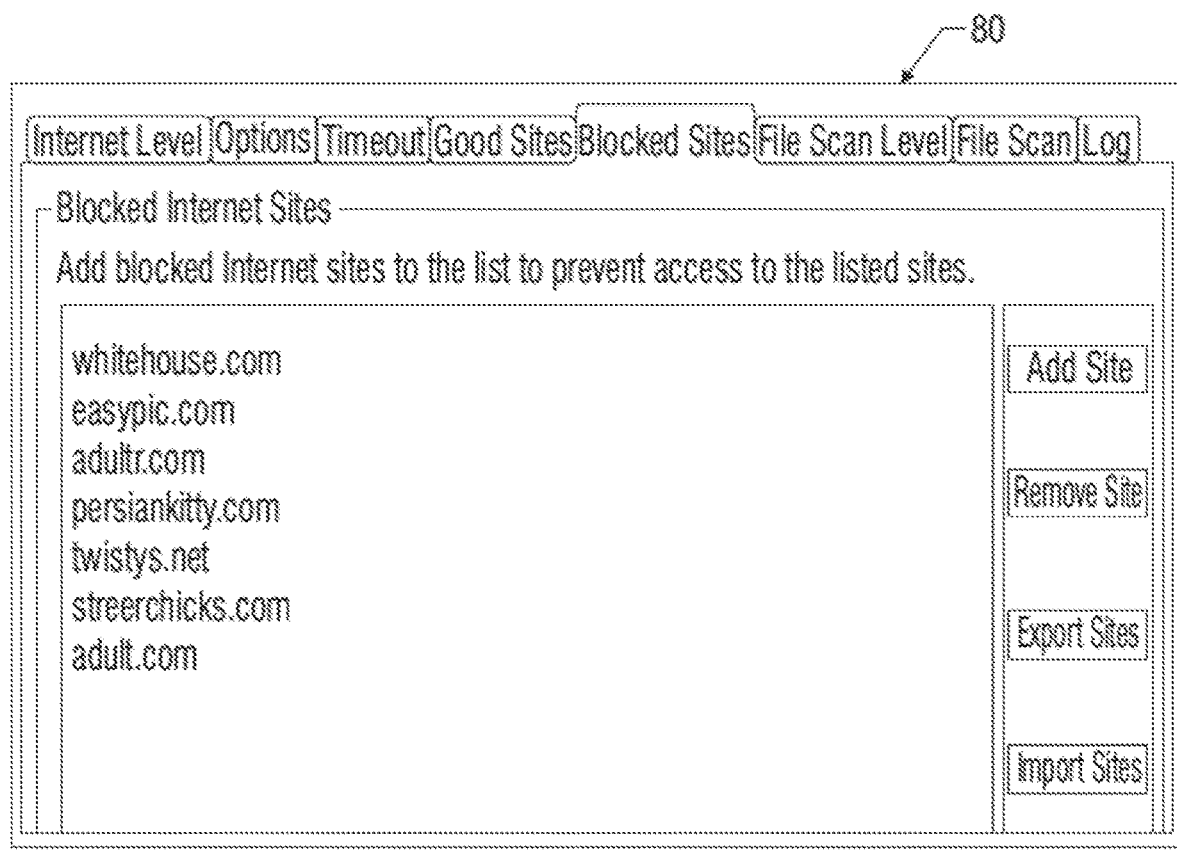
FIG. 10 is an embodiment of a blocker filter user interface useful with an embodiment of a hyperdocuments analysis system, hypermedia request routing system, or any combination thereof, in accordance with the present invention.
Figure 11:
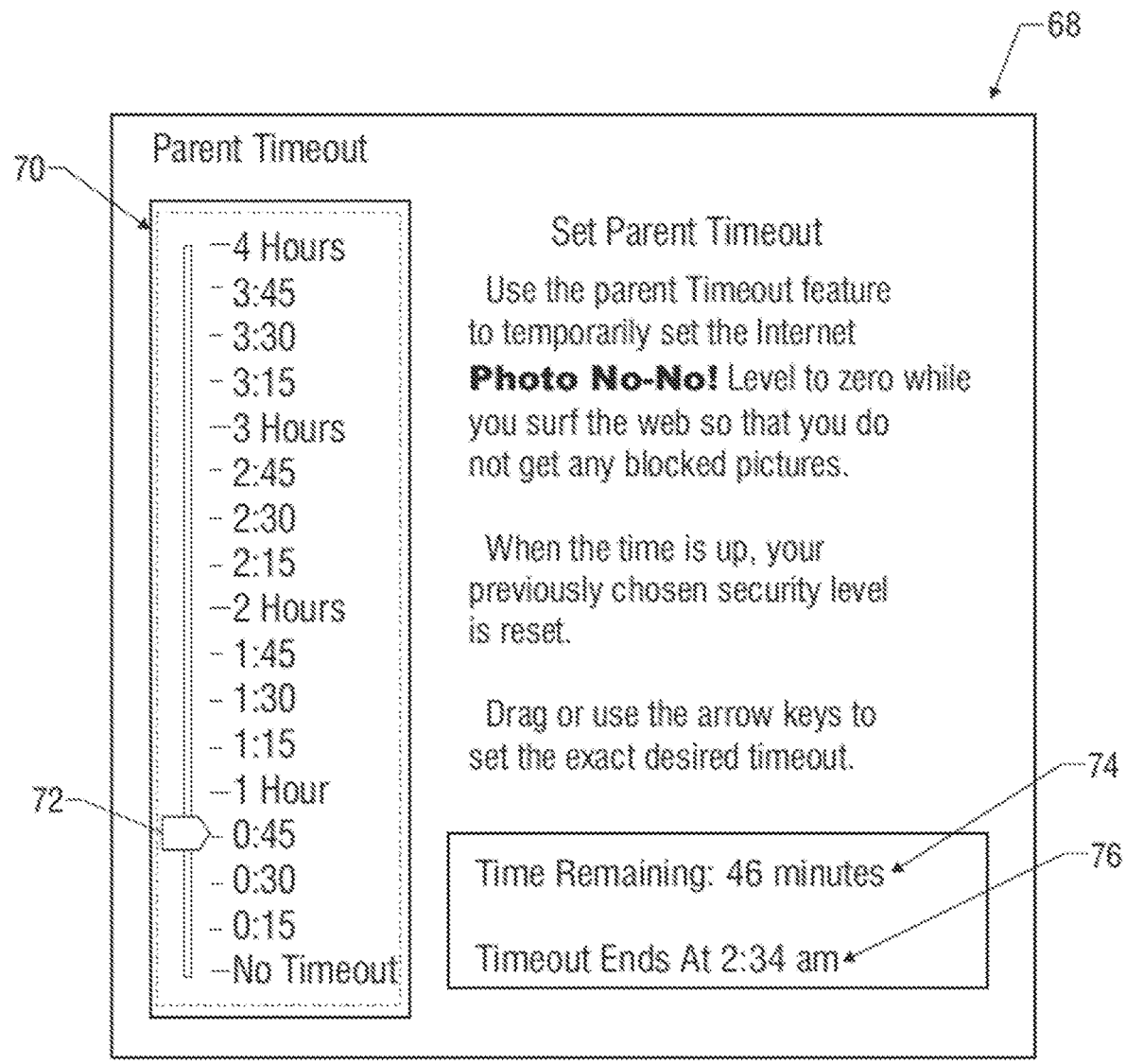
FIG. 11 is an embodiment of a timeout tool user interface useful with any combination of an embodiment of a hyperdocument analysis, evaluation system, or hypermedia request routing system in accordance with the present invention.

When included, the user interface 44 may have any suitable format, capabilities and functionality. For example, the user interface 44 may be at least one graphical user interface or command line interface for user-guided management of the HRRS 18 and/or for providing information. Example user-guided preferences are settings for the setup and operation of aforementioned and below described components. FIGS. 10 and 11 herein provide examples of possible user interfaces 44. The user interface provides the ability to set user options. It can be located on the same machine or accessed by a remote machine through a web interface or other manner, allowing remote configuration of the HRRS 18.

Figure 3:
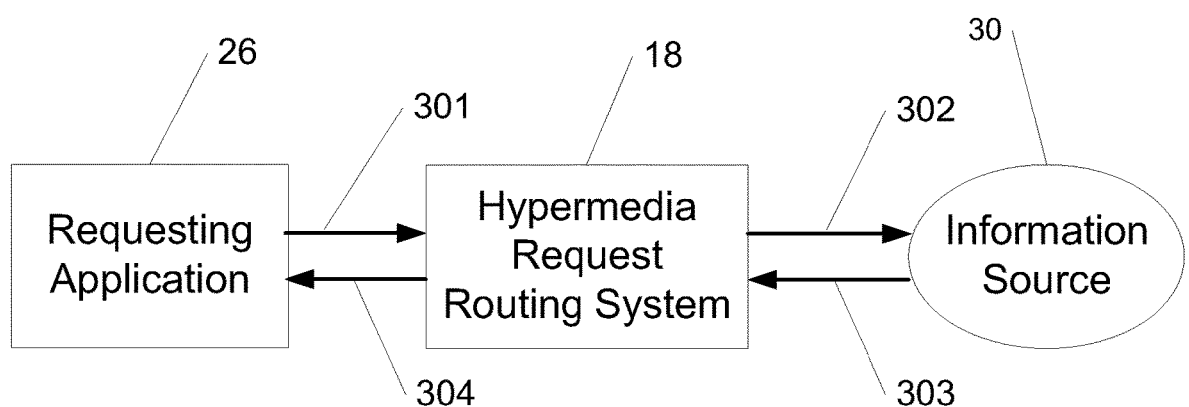
FIG. 3 is a flow diagram illustrating the interaction between an embodiment of a hypermedia request routing system and a requesting application and information source.

FIG. 3 shows the process a requesting application goes through when used in conjunction with the HRRS. In Step 301, a requesting application 26, such as a web browser, requests hypermedia through a hypermedia request routing system 18. The hypermedia request routing system 18 evaluates the hypermedia request. Based on the analysis of the request, the HRRS requests hypermedia from an information source 30 (Step 302). The hypermedia is obtained from the information source 30 (Step 303) and returned to the requesting application 26 (Step 304). The HRRS 18 can modify the hypermedia request and obtain the hypermedia from an information source 30 that is not the same as the information source requested by the requesting application 26. For example, a web browser might request hypermedia from a web site ww.example.com in the form of an HTTP request URL, "http://www.example.com/index.html", and the HRRS might modify that HTTP request URL to "http://example 2.com/index2.html" based some redirection logic in the HRRS. The information source 30 would then be "www.example 2.com".

Hypermedia is retrieved over the Internet in many different ways. These ways include, but are in no way limited to, Hypertext Transfer Protocol (HTTP), Hypertext Transfer Protocol Secure (HTTPS), File Transfer Protocol (FTP), and other methods including user implemented methods for retrieving hypermedia. HTTP is the protocol used to send requests from a browser or other web based application to a web server and to transport pages or resulting documents, including hypermedia, from web servers back to the requesting browser or web based application.

Hypermedia requests can be in the form of, but not limited to, a Uniform Resource Identifier (URI) or a Uniform Resource Locator (URL) with optional additional information such as a cookie, database request, or file request at the network or operating system level. A URI is a character string used to identify a resource from a local machine, network attached machine or anywhere on the Internet by type and location. The set of URIs include Uniform Resource Names (URNs) and Uniform Resource Locators (URLs). URLs are used to locate Internet resources by a web browser or web-based application. A cookie is a block of data that a web server stores on a client system in response to a request from the client which is sent back to the web server when the user returns to the same site. A cookie normally consists of name value pairs and is used to identify users, instructing the web server to send a customized version of a document.

Figure 4:
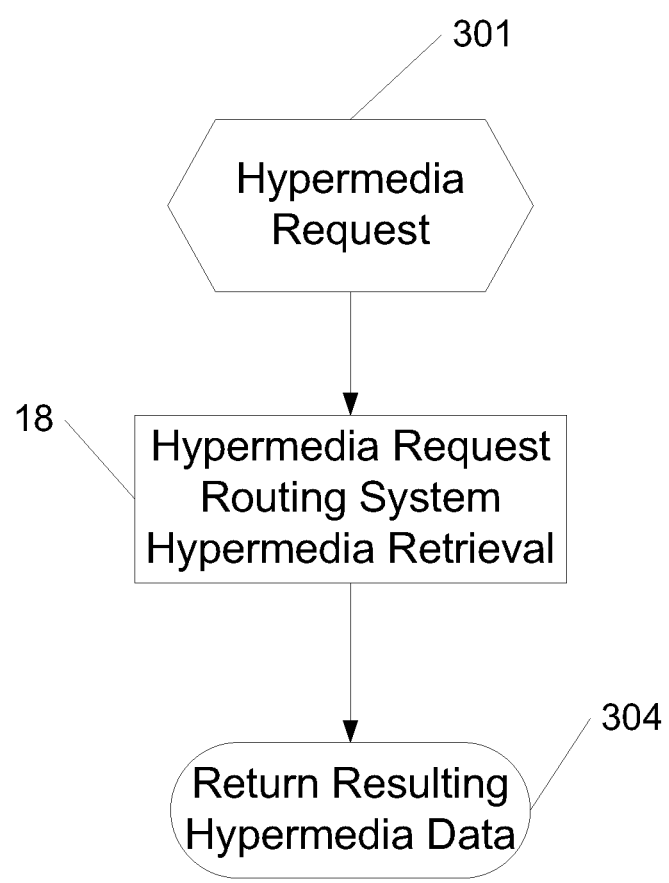
FIG. 4 is a flow diagram illustrating the external view of the process performed by an embodiment of a hypermedia request routing system.

FIG. 4 is a flow diagram of FIG. 3, showing a hypermedia request (Step 301) from a requesting application passed to the HRRS 18. The HRRS modifies the hypermedia request if necessary, obtains the resulting hypermedia, and returns the hypermedia (Step 304).

Figure 5:
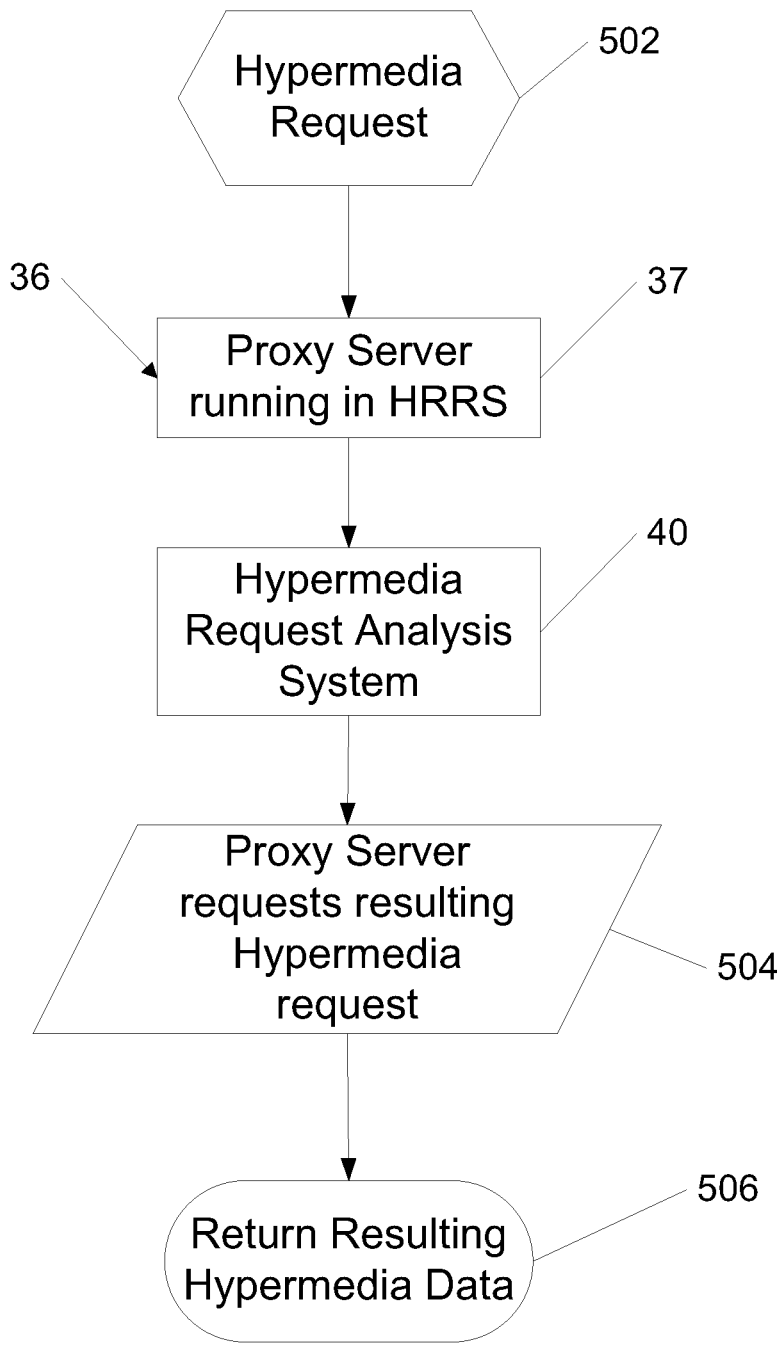
FIG. 5 is a flow diagram illustrating the process performed by an embodiment of a hypermedia request routing system that uses a proxy server in accordance with the present invention.

When included, the hypermedia routing tool, or router, 36 may have any suitable desirable format and functionality as is or becomes known. In the embodiment of FIG. 5, the hypermedia router 36 is a proxy server 37, which, if desired, may be any suitable commercially available proxy server. The exemplary proxy server 37 is software that receives a network address, URI or URL and other information such as cookie(s), or other source location address of hypermedia or a combination thereof from a requesting application (Step 502). The hypermedia request is then passed to the hypermedia request analysis system 40, which evaluates and possibly modifies the request based on possible user settings and request routing logic. In Step 504, the proxy server 37 requests the resulting hypermedia request from the Internet or other information source. After the proxy server 37 receives the hypermedia, it returns the resulting hypermedia (Step 506). Alternatively, the hypermedia router 36 could be a content transfer tool socket hook instead of a proxy server 37.

Figure 6:
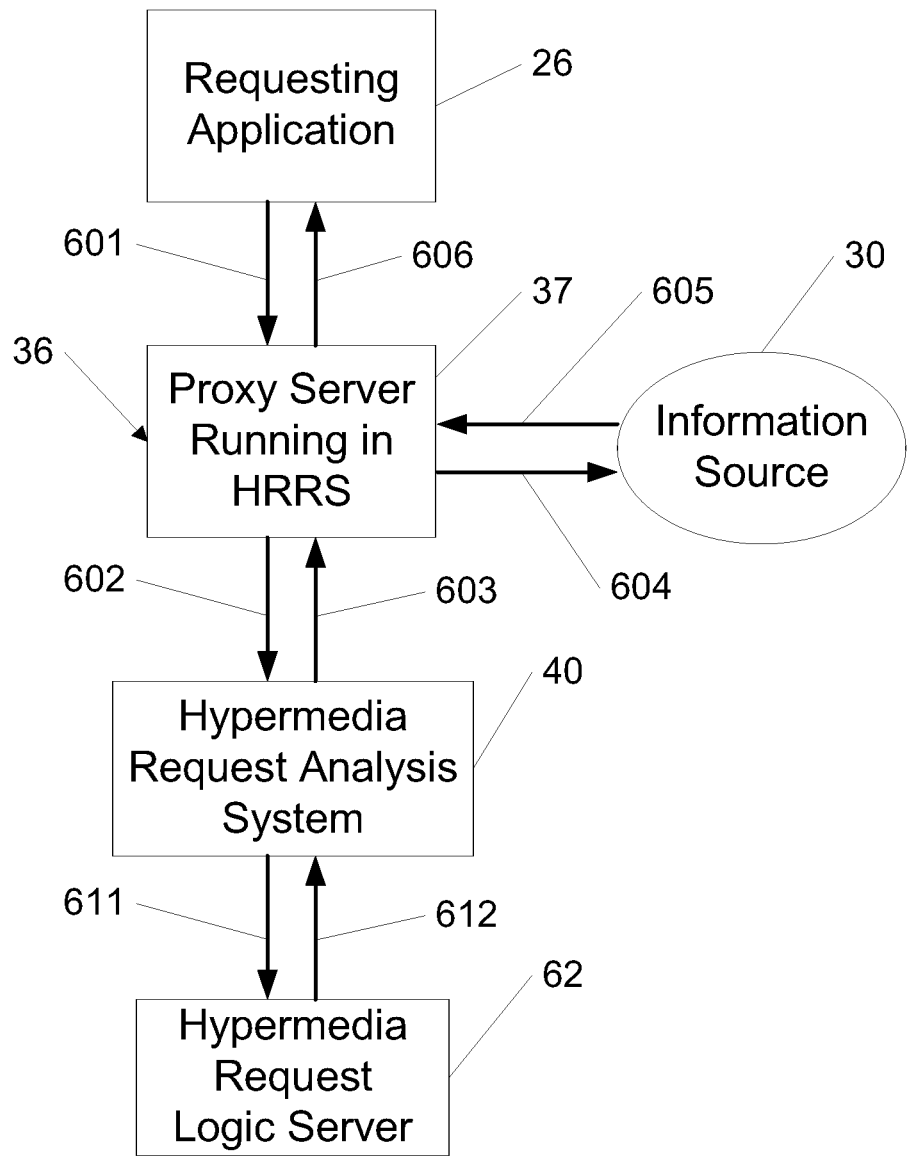
FIG. 6 is a flow diagram illustrating the interaction between components of an embodiment of a hypermedia request routing system that uses a proxy server and a requesting application and information source in accordance with the present invention.

In the embodiment of FIG. 6, the hypermedia router 36 is a proxy server 37 as in FIG. 5. The exemplary proxy server 37 may be running on the local computer that is also running the requesting application 26 or on another computer on the same or other local or remote area network or Internet or implemented in hardware. The proxy server receives a request from a requesting application 26 (Step 601). The proxy server then passes the request to the hypermedia request analysis system 40 (Step 602). Analysis is performed and the resulting hypermedia request is returned to the proxy server (Step 603). The proxy server then executes the resulting hypermedia request (Step 604) from an information source 30. The resulting hypermedia is retrieved (Step 605) by the proxy server 37 and returned to the requesting application 26. The hypermedia request analysis system 40 need not be on the same computer as the proxy server 37 or hypermedia request logic server 62. Instead, the hypermedia request analysis system 40 can be on an entirely different computer or server, and the proxy server 37 can pass the hypermedia request over a network connection via any remote procedure call, HTTP request, network connection or other method for Step 602 and Step 603.

Still referring to FIG. 6, Step 611 and Step 612 illustrate the updating of the hypermedia request analysis system 40 by a hypermedia request logic server 62. The term "update" means to make a system or data file more current. The hypermedia request analysis system 40 requests any updates to the hypermedia request routing logic (Step 611) and the hypermedia request logic server 62 returns any updates (Step 612). The hypermedia request analysis system 40 can be updated synchronously or asynchronously. In a synchronous update, the update depends on the timing of events, such as once the hypermedia request analysis system 40 receives the hypermedia request (Step 602) it checks for updates (Step 611) from the hypermedia request logic server 62. Any updates are retrieved (Step 612) and applied to the hypermedia request analysis system 40 before the hypermedia request is analyzed. Once the hypermedia request is analyzed, operation continues as noted before.

In an asynchronous update, the hypermedia request analysis system can be updated independent of any timing mechanism in a way that is not dependent on the timing of any other part of the system. The update of the hypermedia request routing logic can be "pushed" to the hypermedia request analysis system by the hypermedia request logic server (Step 612). The term "push" means to send data, or a program, from a server to a client at the request of the server. In this example, the request by the hypermedia request analysis system for the update is not performed (Step 611). When the update is pushed, Step 611 is omitted and only Step 612 is performed. The update is sent from a request from the server to the client, the client being the hypermedia request analysis system 40 and server the hypermedia request logic server 62.

Another way to perform updates is by having a set of program code, such as in an independent thread of execution, to asynchronously check for and apply updates, Steps 611 and 612. This check is not performed at any specific time during the process outlined in FIG. 6.

Figure 7:
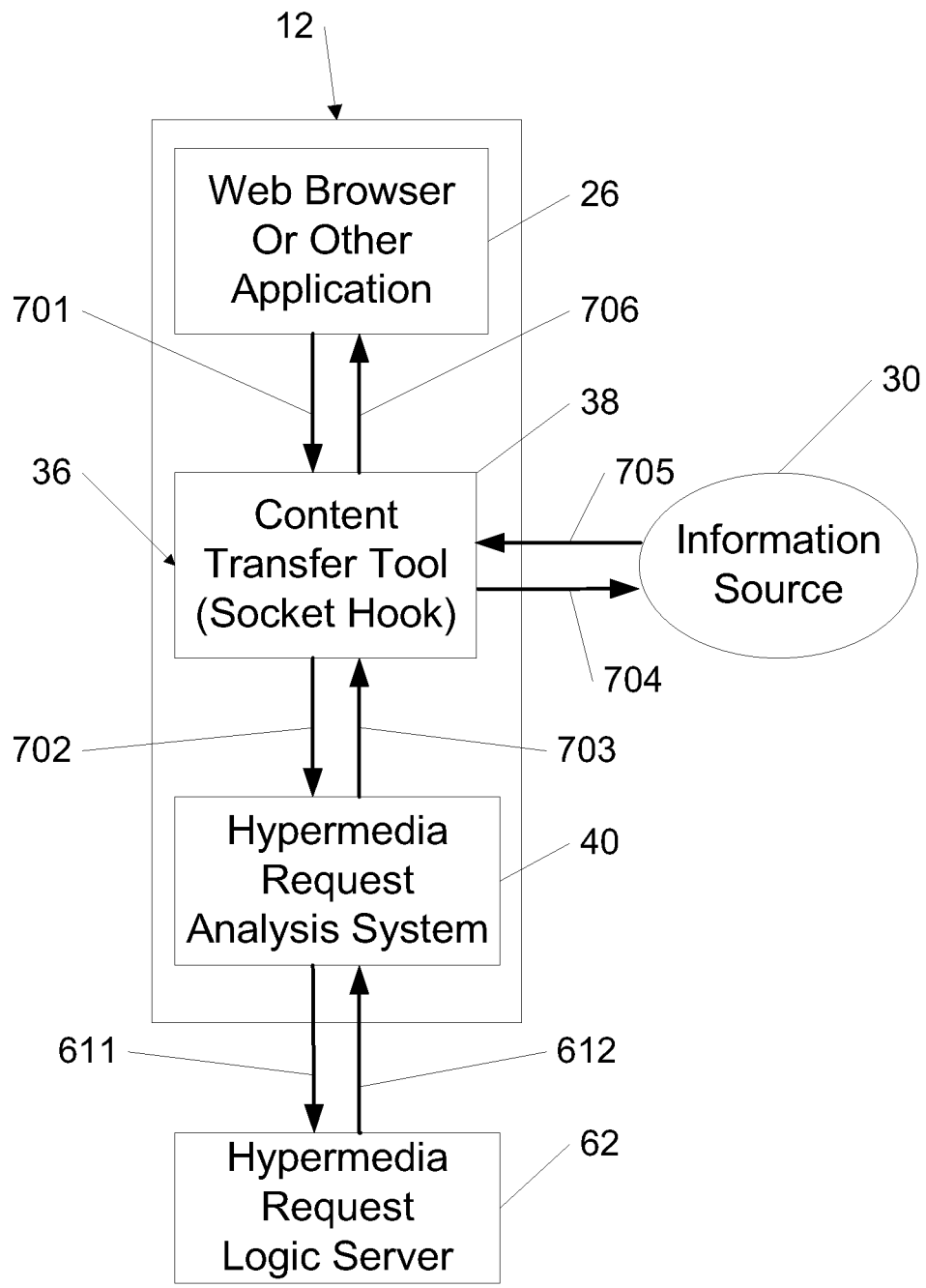
FIG. 7 is a flow diagram illustrating the interaction between components of an embodiment of a hypermedia request routing system that uses a content transfer tool and a requesting application and information source in accordance with the present invention.

In the embodiment of FIG. 7, the hypermedia router 36 is a content transfer tool 38. In this example, the content transfer tool 38 is software that is a socket hook which is located on an electronic device, such as a computer 12, along with the HRRS 18. A socket can be defined as an identifier for an endpoint or specific service on a node in a network. A hook is a location in a program in which new program instructions can be inserted for the purpose of enhancing functionality. In this case a socket hook is a location in the operating system where a program routine can be inserted into the socket implementation of the operating system in order to enhance functionality of sockets. In the embodiment of FIG. 7, the socket hook is a TCP/IP socket hook. TCP/IP is an acronym for Transmission Control Protocol/Internet Protocol which is used in creating HTTP, HTTPS, and FTP, the protocols widely used on the Internet. The socket hook can be used with other protocols. The content transfer tool can also be software that is a direct plug-in to the requesting application 26, such as a web browser. The content transfer tool 38 may, if desired, be any suitable request filter which is or may be commercially available. Additionally, the hook may be an operating system hook, intercepting file read and write requests at the operating system level, thereby allowing the analysis of local and network attached storage requests.

Still referring to FIG. 7, the requesting application 26 requests hypermedia from one or more information sources 30 as the result of a network request (such as for a URI), file transfer request, copy request, database request or other form of information retrieval procedure request. The socket hook 38 intercepts the request for hypermedia from the requesting application (Step 701). The socket hook then passes the request to the hypermedia request analysis system 40 (Step 702). Analysis is performed and the resulting hypermedia request is returned to the content transfer tool socket hook (Step 703). The content transfer tool then executes the resulting hypermedia request (Step 704) from an information source 30. The resulting hypermedia is retrieved (Step 705) by the content transfer tool 38 and returned to the requesting application 26. In other embodiments, the content transfer tool 38 may not be part of HRRS 18 but could instead be initiated by the requesting application 26 as a shared object and communicate with the HRRS by invoking methods on the shared object.

Alternatively, the hypermedia request analysis system 40 may be on an entirely different computer from the computer running the content transfer tool 38 or the computer running the hypermedia request logic server 62. The content transfer tool 38 can then pass the hypermedia request over a network connection via any remote procedure call, HTTP request, network connection or other method for steps 702 and 703 to and from the hypermedia request analysis system 40.

FIG. 7 also shows the updating of the hypermedia request analysis system 40 by the hypermedia request logic server 62. As described above for FIG. 6, this update process can be either and synchronous or asynchronous, or pushed.

Figure 8:
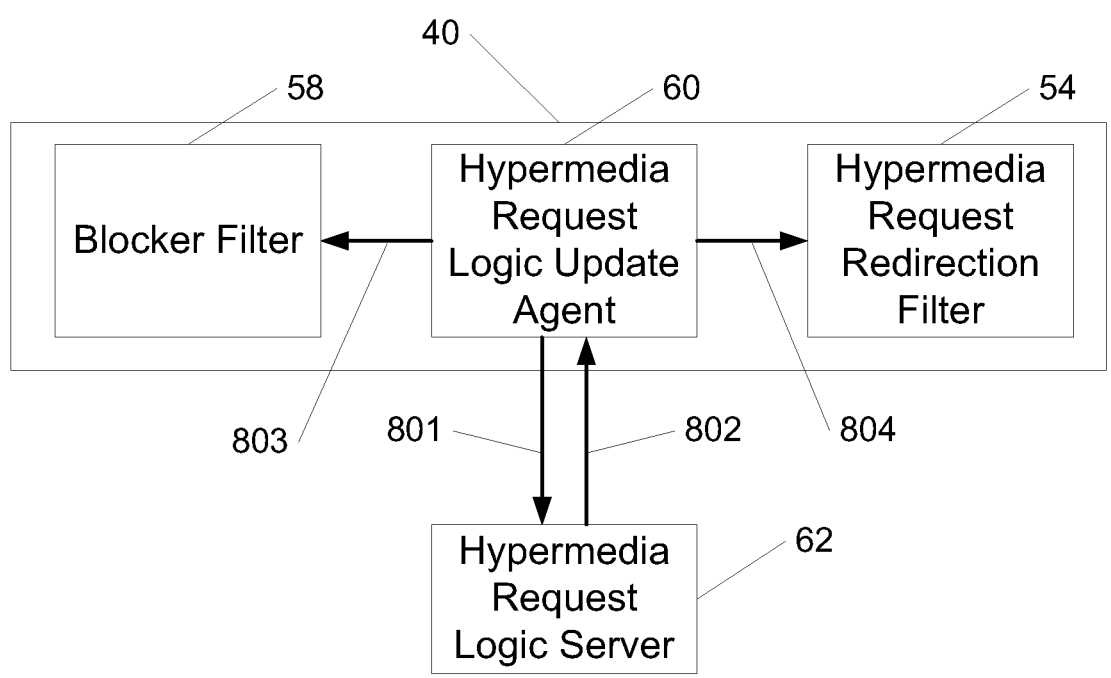
FIG. 8 is a flow diagram illustrating the dynamic update process performed by and embodiment of the hypermedia request routing system in accordance with the present invention.

In accordance with the present invention, an update agent can handle or request hypermedia request logic updates. In the illustrated embodiment of FIG. 8, the hypermedia request analysis system 40 is updated by the hypermedia request logic server 62. The term dynamic means an action takes place when and as needed. Update means to make a system or data file more current. The HRRS 18 is capable of dynamic updates, meaning it can be made more current when needed. In the embodiment, the update is for blocker filter 58, if included, and hypermedia request redirection filter 54 logic by a hypermedia request logic server 62. An update may also be applied to individual system components or the entire system. In a synchronous update, the hypermedia request logic update agent 60 requests an update from the hypermedia request logic server 62 (Step 801). If the logic is out of date, the hypermedia request logic server 62 sends the update logic in whole or in part, or only the changes, to the out of date portions of the logic to the hypermedia request logic update agent 60 (Step 802). The hypermedia request logic update agent 60 then applies the logic update to the blocker filter 58 (Step 803) and hypermedia request redirection filter 54 (Step 804).

In some embodiments, the hypermedia request logic server 62 can asynchronously apply any updates to the HRRS by skipping Step 801. This can be accomplished by keeping a message channel, such as a socket, open to the hypermedia request logic update agent 60 or by use of an asynchronous message system. The update is then "pushed" to the client or HRRS. The update can also be performed individually for each element requiring updated hypermedia request redirection logic at separate times. Updating the individual components separately can allow for more efficient processing and less overhead on network, processor, and other components.

Figure 9:
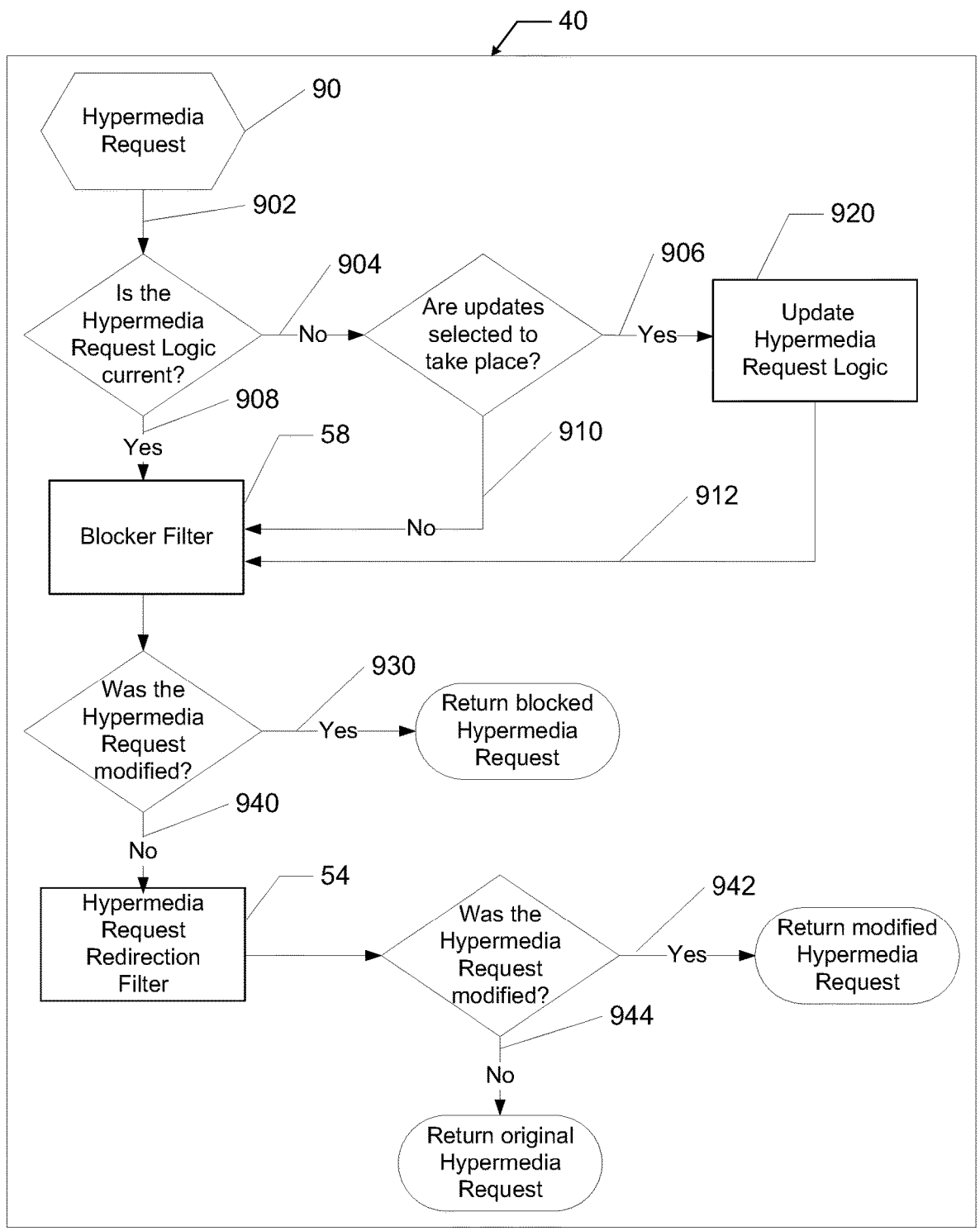
FIG. 9 is a flow diagram illustrating the process performed by an embodiment of a hypermedia request analysis system in accordance with the present invention.

Now referring to FIG. 9, a preferred embodiment of a hypermedia request analysis system 40, a portion of a HRRS 18 in accordance with the present invention, is shown. A hypermedia request 90 is provided to the hypermedia request analysis system (Step 902). If the hypermedia request logic is current or "up-to-date", then the hypermedia request 90 is passed to the blocker filter 58, if included. If the logic is not current (Step 904), and if updates are selected to take place (and/or the HRRS is configured to update synchronously) (Step 906), the hypermedia request logic is updated 920, and the hypermedia request 90 is passed to the blocker filter 58 (Step 912). If updates are not selected to take place (Step 910), then the hypermedia request 90 is passed to the blocker filter 58. The blocker filter then evaluates and possibly modifies the hypermedia request 90 as described in the specification.

Still referring to FIG. 9, if the hypermedia request 90 was not modified by the blocker filter 58, then the hypermedia request 90 is passed to the hypermedia request redirection filter 54 (Step 940). If the hypermedia request 90 was modified, then the blocked hypermedia request is returned from the hypermedia request analysis system 40 (Step 930).

The hypermedia request redirection filter 54 then performs analysis and possible modification of the request as described further in the specification. If the hypermedia request 90 was modified, then the modified request is returned (Step 942). If the hypermedia request 90 was not modified, then it is returned from the hypermedia request analysis system 40 (Step 944).

The hypermedia request analysis system 40 evaluates hypermedia requests in any manner, for any purpose and with any criteria as desired. For example, the hypermedia request analysis system 40 may be designed to determine if a hypermedia requests should be allowable for retrieval. In another example the hypermedia request may be blocked by modifying the request to be for another server or for a local file, such as a URI request for "http://blockedsite.com" to be modified to "file:///c:/somepath/blocked.html". In another example, the hypermedia request may be modified to point to another web server, such as a URL request for "http://serverone.com" to "http://servertwo.com". In another example, the hypermedia request may be modified to point to different pages or results or queries on the same or different server, such as a URL request for "http://example.com/q?terma" to "http://example.com/q?termb". In another example a hypermedia request for "http://example.com" with no cookies might be modified to contain a cookie with value "safe=on". In some embodiments, the hypermedia request may be graded and categorized among multiple categories or based on specific criteria, upon which the final decision of whether and what to allow is based. The selection criteria, which, if desired, can be set by a user, may be based upon words, phrases, and/or other types of information in the hypermedia request or the nature of content in the hypermedia request such as cookies.

In some embodiments, the hypermedia request logic check for current (Step 902) may be skipped and the hypermedia request 90 is passed directly to the blocker filter 58. This can occur as a default, per user selection criteria, or under certain situations, such as a heavy server load, network unavailability, outage, or other conditions.

The blocker filter 58, when included, may have any desired form, format and capabilities and operate as is or becomes known. The exemplary blocker filter is software and may be any suitable commercially available blocker filter. When activated, the blocker filter 58 compares an incoming hypermedia request's source location, or any portion thereof, to a list of disallowed information sources, addresses or other identifying indicia. In the present embodiment, the blocker filter 58 uses fast lookup methods for comparing the hypermedia source location and subsets of that location (such as a URI specific location) to an "Always Block" list. For example, the URL "http://www.whitehouse.com/subdirectory/file.html" may be blocked if the address "whitehouse.com" is in the "Always Block" list, since the "whitehouse.com", or base address, portion of the URL is in the "Always Block" list. For another example, the URI "file:///d:/somepath/file" may be blocked if the host "d:/" is in the "Always Block" list.

FIG. 10 shows an example blocker filter user interface 80 relating to an "Always Block" list. If a match is found, an appropriate disposition action takes place, such as the requesting application (or other designated destination(s)) being provided with hypermedia that is entirely or partially replaced with designated data. For example, the following text could be displayed when the user attempts to access blocked hypermedia: "The site you have requested has been blocked."

In this embodiment, if the hypermedia's source location is not on the "Always Block" list, the hypermedia request is passed to another component of the HRRS 18 for further analysis or evaluation.

If desired, the blocker filter 58 may also or instead compare the incoming hypermedia request's source location, or any portion thereof, to a list of allowed information sources, addresses or other identifying indicia. This operation would be similar to the operation described above with respect to the "Always Block" list, except the list would be an "Always Allow" list and the opposite actions as those described above upon would occur.

The timeout tool 39, if included, is used to temporarily stop the evaluation of hypermedia requests by the HRRS 18. When the timeout tool 39 is activated, hypermedia requests by the requesting application 26 are not evaluated by the HRRS 18. In fact, if the hypermedia router is a content transfer tool socket hook, as described in the specification for FIG. 7, the socket hook might be uninstalled so that the requesting application 26 can access the information source directly. Similarly, for other implementations of the hypermedia router, bypassing the HRRS 18 completely while the timeout is in place may be performed. The timeout tool 39 may have any desired capabilities and format.

For example, referring to FIG. 11, an embodiment of a timeout user interface 68 for an exemplary timeout tool of a HRRS 18, is shown. The interface 68 includes a timeout clock controller 70. The illustrated timeout clock controller 70 may be user-set and changed by dragging a timeout pointer 72 or with the use of arrow keys on a keyboard or keypad associated with the interface 68. The pointer 72 is thus set by the user to establish the duration of the timeout period, which automatically starts the timeout clock. Thereafter, the pointer 72 automatically moves down the illustrated face of the controller 70 to the bottom, when the timeout ends. A corresponding time remaining indicator 74 displays the same information as the controller 70 (the amount of time remaining in the timeout) and similarly changes in real time. A timeout end time indicator 76 displays the actual end time of the timeout session. At any time, even during a timeout, the user can move the pointer 72 to reset the timeout, which automatically adjusts the time remaining indicator 74 and timeout end time indicator 76. When the timeout period ends, the HRRS 18 automatically resumes hypermedia request evaluation for future requests by the requesting application 26. If the hypermedia router was uninstalled or bypassed, as may be performed for a content transfer tool socket hook, the socket hook would be reset or a new socket hook created to start receiving and evaluating hypermedia requests by the HRRS 18 when the timeout ended.

An Internet search is the process of seeking specific data on the Internet and is usually performed through an Internet search engine. An Internet search engine is a program that searches for information found on the World Wide Web, newsgroups, Gopher menus, and FTP archives. The information can be located in hypermedia, databases, files, or any other form. Search results can be requested and provided in the form of hypermedia, specifically HTML or XML. The requests can be in the form of HTTP, HTTPS, or other formats comprising a URL or URI and other identifying information such as cookies or other data. Google.com, Yahoo.com, and Msn.com are just a few of the thousands of Internet and specialty search engines that search the Internet for content.

Figure 12:
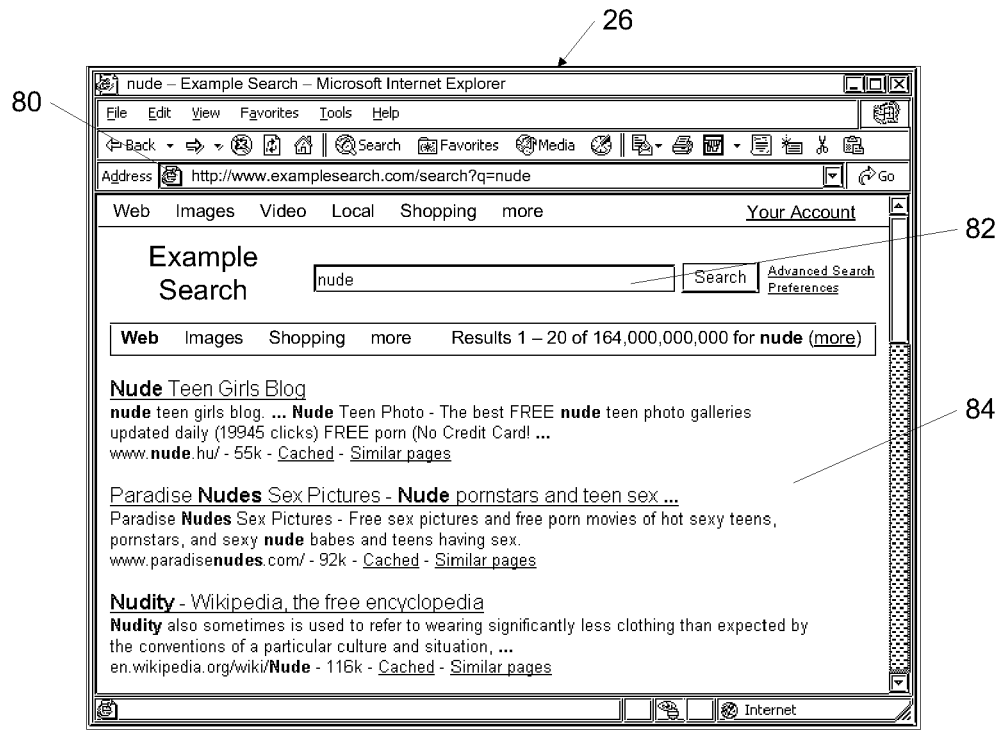
FIG. 12 is an example of a web browser performing a non-safe Internet search.

FIG. 12 shows an example of a typical non-safe Internet search for the term "nude" on an example search engine. The requesting application 26 is a web browser. The hypermedia request 80 is a URL for "http://www.examplesearch.com/search?q=nude". This URL was generated by the web browser 26 in response to HTML form input for the search term "nude" 82. Approximately 164 million results are returned 84.

Some search engines support a safe search. This is a web search that filters out potentially harmful or offensive material as determined by the individual search engine. The web search engine tracks the user preferences by appending a code or flag to the end of the URI or adding a property to a cookie that is set by the web server to instruct the server to send a customized version of a web page, in this case a filtered search result. Both the URI and a cookie can be modified by a search engine.

Figure 13:
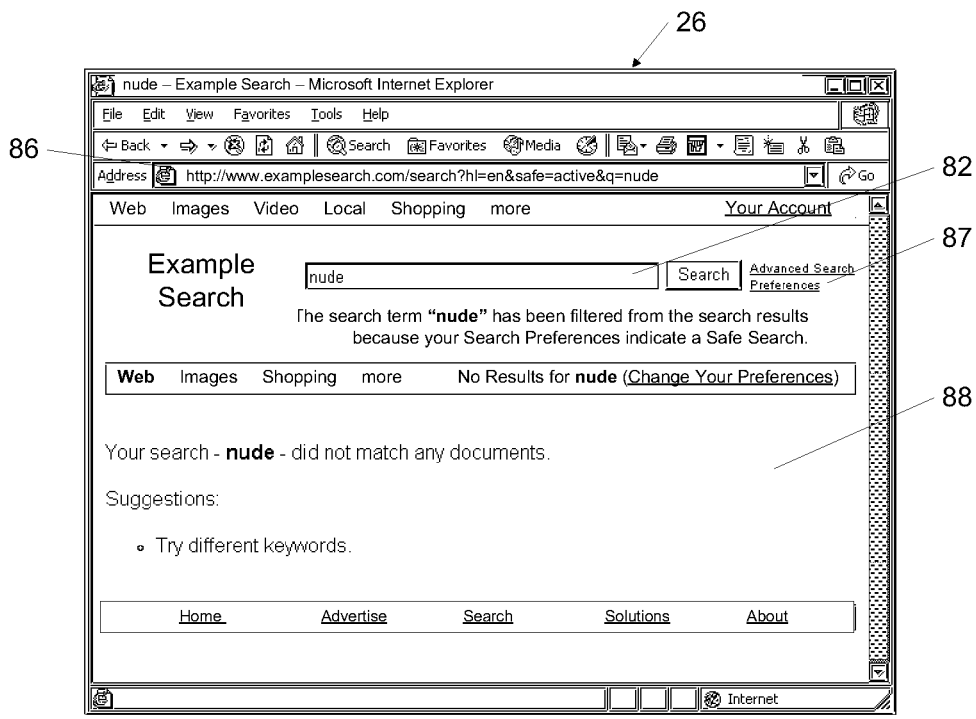
FIG. 13 is an example of a web browser performing a safe Internet search.

FIG. 13 shows an example of a safe Internet search for the same search term "nude" on the same example search engine. The requesting application 26 is a web browser. The hypermedia request 86 is a URL for "http://www.examplesearch.com/search?hl=en&  safe=active&q=nude". This URL was generated by the web browser 26 also in response to HTML form input for the search term "nude" 82, but also to a cookie for safe search that was set to indicate to perform a safe search. A cookie was set by the web browser in response from the web server when the user updated the "Advanced Search Preferences" 87. A cookie is a block of data that a web server stores on a client system in response to a request from the client that is used to send a customized version of a web page, such as to return safe search results, one such being the filtered search result 88 in the example FIG. 13, to a user on subsequent searches.

However, not only does just a few of the thousands of Internet and specialty search engines offer the safe search feature, but the feature can easily be turned off with just a mouse click by a user searching the Internet. A user can just click on the "Advanced Search Preferences" 87 and choose to not restrict search result content. This will change a cookie in the user's browser so that subsequent searches will be non-safe. Alternatively, a user could change a URL to remove a term, such as "safe=active", from the URL, potentially making the search unsafe. Unsafe searches can potentially result in harmful or offensive material, pornography, viruses, worms, spyware, etc. By forcing searches to be safe, the chance of finding or running across harmful material is reduced. In the same manner, URIs, which include URLs and local file requests, can be evaluated and routed or redirected to protect users from confidential material, restricted access documents, other files or documents. The redirection of hypermedia requests can be achieved by a hypermedia request redirection filter 54.

Figure 14:
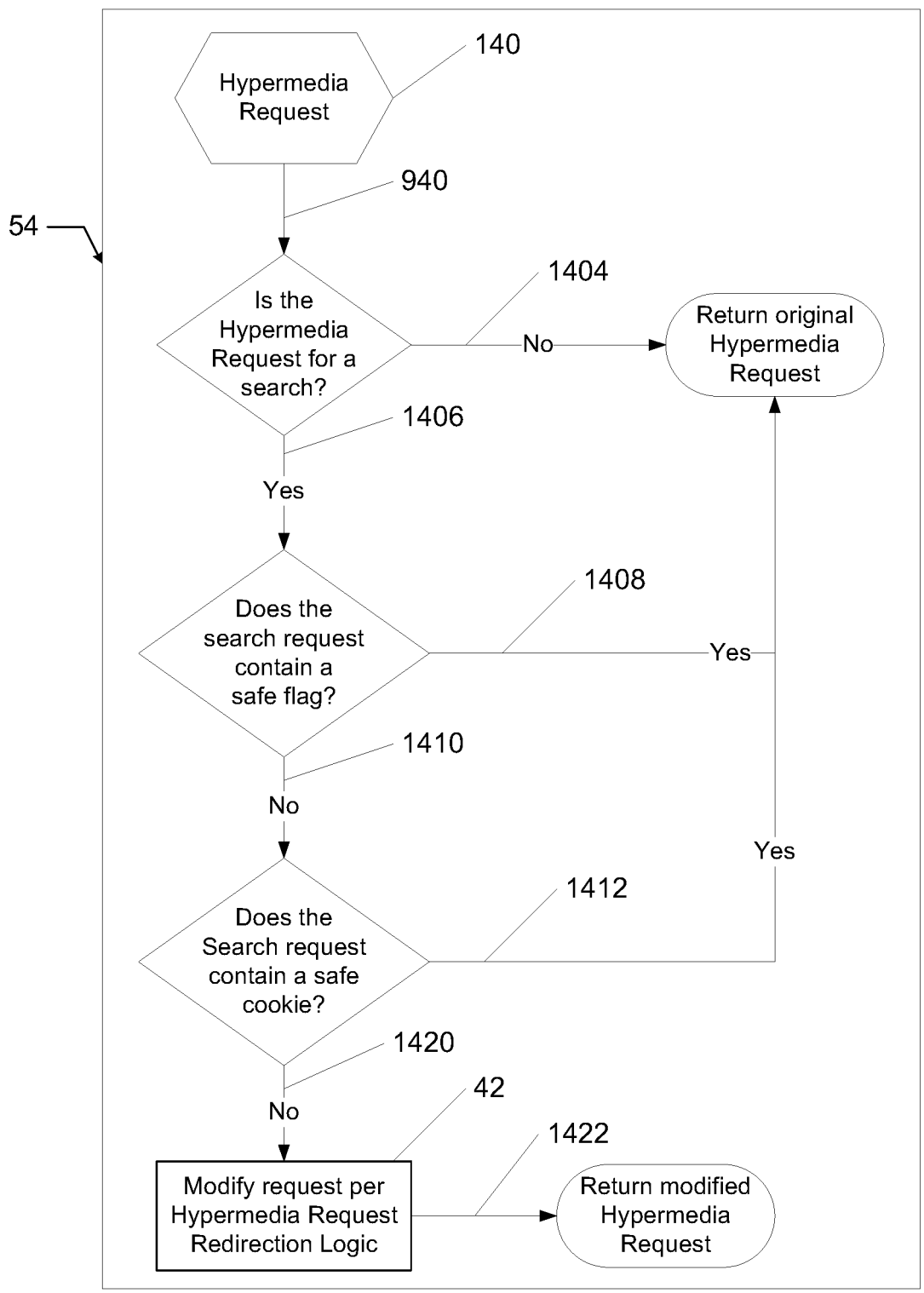
FIG. 14 is a flow diagram illustrating the process performed by an embodiment of a hypermedia request redirection filter in accordance with the present invention.

Now referring to FIG. 14, an embodiment of a method of operation of a hypermedia request redirection filter 54, a portion of a HRRS 18 in accordance with the present invention, is shown. The hypermedia request redirection filter 54 receives a hypermedia request 140 as part of the hypermedia request analysis system 40 (Step 940). If the hypermedia request 140 is not for a search, then the original hypermedia request 140 is returned (Step 1404). If the hypermedia request 140 is for an Internet search, then if the hypermedia request contains a safe search flag in the URI (Step 1408) or the hypermedia request contains a cookie that indicates a safe search (Step 1412) the original hypermedia request 140 is returned to the hypermedia request analysis system 40. A safe search flag can be in the form of a textual string contained in the properties or path of a URI, such as "safe=active" in the URI:

"http://www.examplesearch.com/search?hl=en& safe=active&q=nude".

A hypermedia request for an Internet search might also be safe even if the URI does not contain a safe search flag if the URI is for a safe search only site or the hypermedia request contains a cookie that indicates to perform a safe search. For example, a cookie set by a web server on a web site might contain a string "safe=on" to indicate all searches should be safe searches.

Still referring to FIG. 14, in step 1420, if the hypermedia request for a search does not indicate a safe search, then the hypermedia request 140 is modified according to hypermedia request redirection logic 42. In Step 1422, the modified hypermedia request is returned to the hypermedia request analysis system 40 and further processing occurs as defined above. The hypermedia request may be modified in such a way as to include a safe search string on the URI or a safe search string in the cookie or in any other manner that would not limit the scope of the hypermedia request modification.

In another embodiment of a hypermedia request redirection filter 54, the hypermedia request redirection filter executes the hypermedia request redirection logic 42 and skips any other steps that would check if the hypermedia request was a search, contained a safe search flag or cookie, or any other steps. By only relying on the hypermedia request redirection logic 42, the hypermedia request redirection filter is updated in all aspects via the hypermedia request logic update agent 60.

In another embodiment of a hypermedia request redirection filter 54, the hypermedia request redirection filter modifies all URIs to point to another URI. All URIs it received are modified to point to another URI, e.g. "http://example.com" is modified to "http://redirected.com". Yet another example redirection filter would be to modify hypermedia requests for files on a hard disk to point to a network location, such as on the Internet, e.g. "file:///d:/somepath/test.doc" would be modified to "http://redirect.com/test.doc" or modified to a user specific URI based on user settings in the user interface 44 such as "http://redirect.com/file?test.doc&user=paramater1" where parameter 1 is a user setting. Multiple user parameters can be added based on various conditions not limited to user environment, user selections, computer settings, date and time information, administrator or parent or guardian settings, etc. Yet another example would be the reverse of the previous example where URIs for Internet information sources is redirected to a user's local computer. Yet another example would be redirecting television advertisements, hypermedia requests, to other advertisements where the information source is a broadcast source 30, such as a television station or cable provider, along a broadcast route 10, such as airwaves or a cable network. A user's environment consists of the configuration of resources available to the user. The logic or implementation of the logic thereof to provide the redirection is in no way limiting of the scope of the invention.

Figure 15:
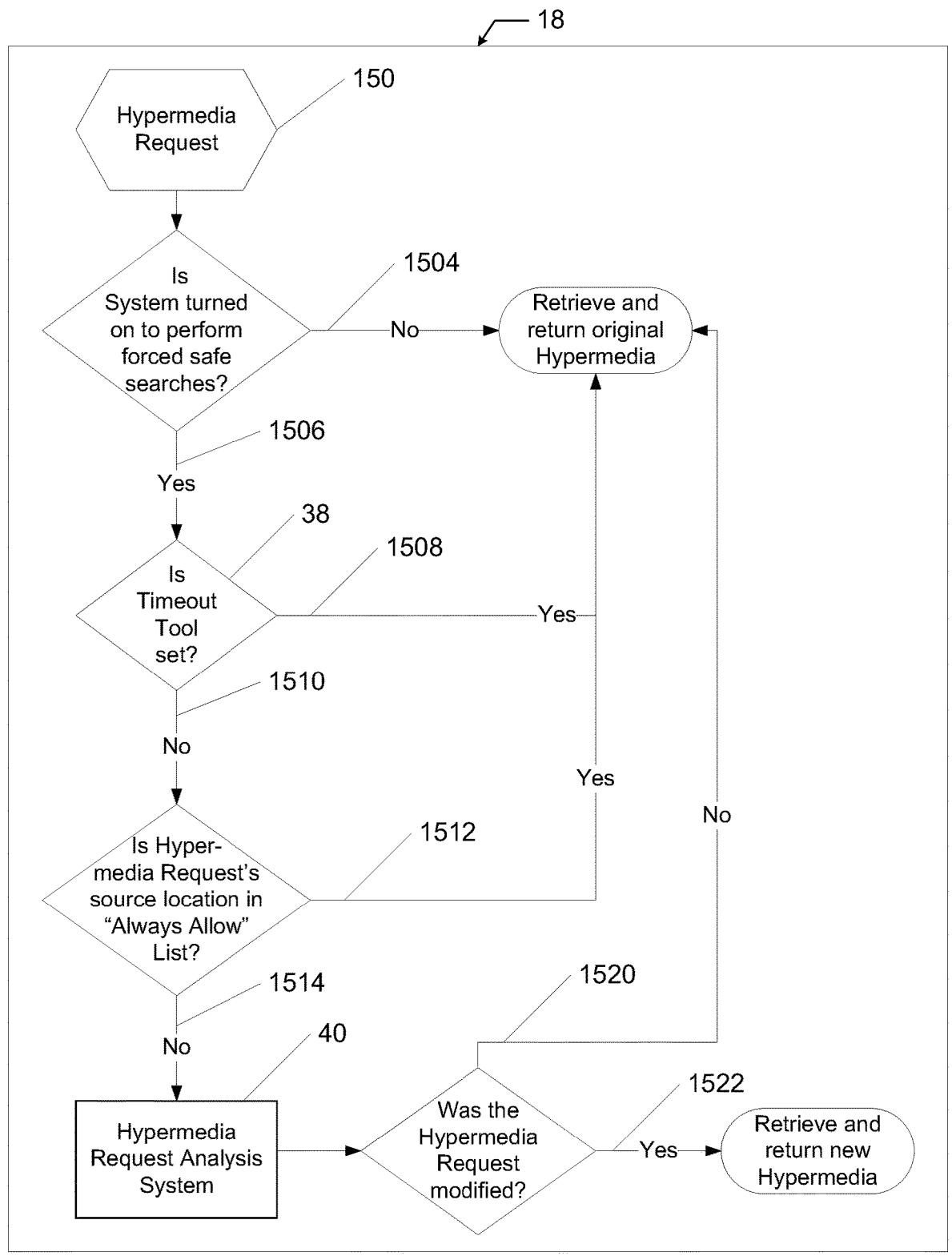
FIG. 15 is a flow diagram illustrating the process performed by an embodiment of the hypermedia request routing system used to force safe Internet searches in accordance with the present invention.

Referring now to FIG. 15, in this embodiment of a HRRS 18, hypermedia requests for Internet searches are forced safe. This system can be described as a forced safe Internet search system. A hypermedia request 150 is received through a content transfer tool, socket hook, or proxy server or by any other means from a requesting application 26. If the system is not turned on to perform safe searches, the original hypermedia request 150 is performed and the resulting hypermedia is returned to the requesting application (Step 1504). If the system is turned on, then the timeout tool 39, if present, is checked (Step 1506). If the timeout tool 39 is set, the system is in timeout mode and not turned on to perform hypermedia request analysis and the original hypermedia request 150 is performed and the resulting hypermedia is returned to the requesting application (Step 1508). If the timeout tool 39 is not set, then the hypermedia request's source location is checked against an "Always Allow" list. If the hypermedia request's source location, or any portion thereof, is in the "Always Allow" list then retrieve and return the hypermedia referenced from the original hypermedia request 150 (Step 1512). If the hypermedia request's source location is not in the "Always Allow" list, then the original hypermedia request 150 is passed to the hypermedia request analysis system 40 (Step 1514). The hypermedia request analysis system 40 analyzes the hypermedia request 150 and possibly modifies the hypermedia request 150. The hypermedia request may be modified, replaced, or kept in original form by the hypermedia request analysis system 40. If the hypermedia request was not modified, then the original hypermedia request 150 is performed and returned (Step 1520). If the hypermedia request was modified, then the new modified hypermedia request is performed and the resulting hypermedia is returned (Step 1522).

The hypermedia request may be, but not limited to being received through a content transfer tool, socket hook, or proxy server or by any other means from a requesting application 26. The hypermedia retrieved by the HRRS 18 may be returned to the requesting application 26 in the final step through the same means of receiving the hypermedia request such as a content transfer tool, socket hook, or proxy server or any means of hypermedia retrieval such as file transfer, HTTP, HTTPS, direct memory access, sockets, or by any other means of sending hypermedia.

Figure 16:
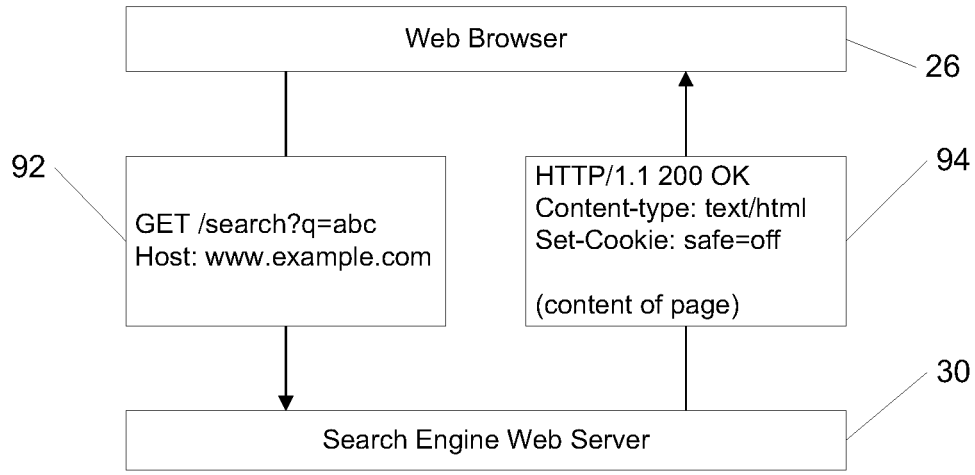
FIG. 16 is a flow diagram illustrating the use of cookies during the request and response process between a web browser and a search engine in accordance with the present invention.

FIG. 16 shows a typical hypermedia request 92 via HTTP by a requesting application web browser 26 for a web page where a web server 30 sets a cookie on the web browser 26. In the HTTP request 92 the web browser 26 opens a socket on the web server 30 and requests the desired hypermedia. In the example shown, the web browser 26 is requesting a web page "http://www.example.com/search?q=abc" by connecting to the web server 30, "www.example.com" and sending:

GET/search?q=abc
Host: www.example.com

Alternatively, the hypermedia request might be for a POST or contain a cookie. The web server 30 then processes the request and returns the hypermedia to the web browser 26 with possible additional information 94. As part of the content of the hypermedia, information may be passed to the requesting application such as the type of hypermedia. In the example the type is text or html, a cookie, content length or size, or any other information about the hypermedia. In this example, the web server sends a cookie with the value "safe=off". This cookie is typically handled by the web browser 26 and sent back to the web server 30 on subsequent requests until the cookie is erased, expires, or is disposed of in any other manner. A cookie may also contain an expiration date, a domain name, a path, and an encrypted connection flag. By no means is the example limiting on the scope of the embodiment. The example is for HTTP, and the invention described in this embodiment applies to any other protocol such as HTTPS, FTP, or accessing hypermedia directly such as from a file, memory, or by any other means.

Figure 17:
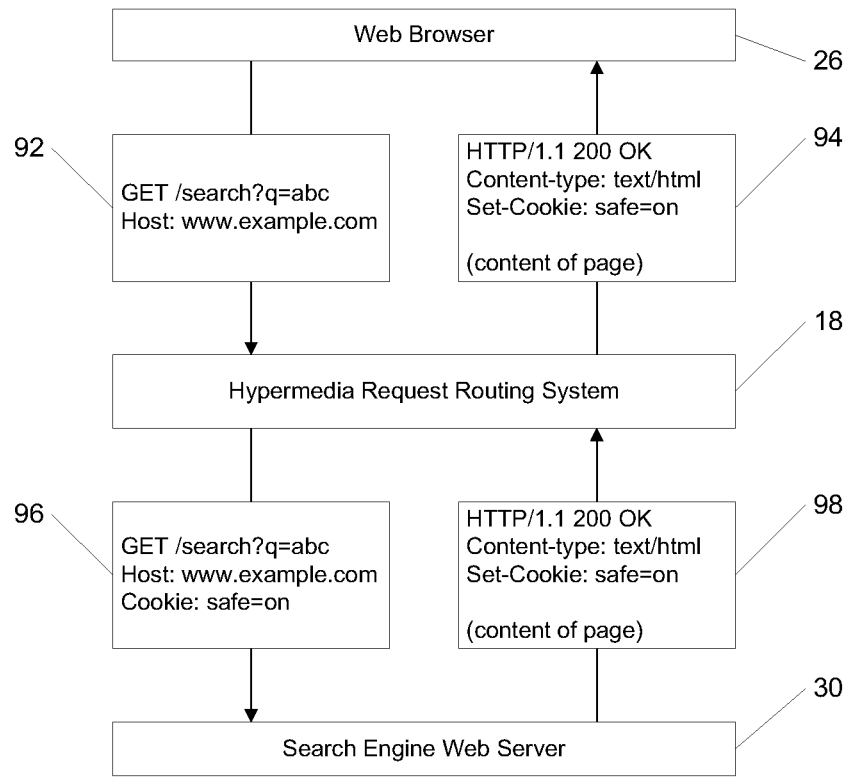
FIG. 17 is a flow diagram illustrating the use of cookies during the process performed by an embodiment of a hypermedia request routing system in accordance with the present invention.

An embodiment of a HRRS is shown in FIG. 17. The example HRRS 18 intercepts HTTP requests and forces any hypermedia requests for Internet searches to be safe searches. The HRRS 18 intercepts the hypermedia request by a web browser 26 via means of a proxy server, content transfer tool, socket hook, or by any other means described previously. The request is then analyzed by the HRRS 18, and the resulting request is retrieved and returned to the web browser 26. The web browser 26 makes a request for an Internet search as in FIG. 16 from a web server 30 using the same hypermedia request information 92. However, the HRRS 18 receives the hypermedia request 92. In this example, the HRRS 18 analyzes the hypermedia request 92 and notices that the HTTP request for "http://www.example.com/search?q=abc" neither contains a safe search flag nor is there a cookie sent from the web browser 26 indicating a safe search. The HRRS 18 then modifies the HTTP request to contain a cookie "safe=on" and this resulting hypermedia request 96 is sent to a web server 30. Alternatively, the HTTP request could have been modified to "http://www.example.com/search?q=abc& safe=on" or another URI, file, or means of retrieving hypermedia based on results from the hypermedia request analysis system and analysis logic, or, if included, a blocker filter. The web server 30 then processes the resulting HTTP request 96 and returns the hypermedia and associated information 98. In this example, the web server 30 sets a cookie "safe=on". The web server also performed a safe search, so the resulting hypermedia and associated information is sent to the web browser 26 unchanged via the HRRS 94. The web browser 26 may include this cookie in further requests for hypermedia from the same web server. In this case the HRRS 18 would not need to modify the hypermedia request. Alternatively, the HRRS could alter or remove the safe cookie, add an additional cookie, provide additional information, or change the content of the resulting hypermedia. The HRRS might need to modify future requests regardless of the modification of the request or result since the routing logic may be dynamically updated. By no means is the example limiting on the scope of the embodiment. The example is for HTTP, and the invention described in this embodiment applies to any other protocol such as HTTPS, FTP, or accessing hypermedia directly such as from a file, memory, or by any other means.

The HRRS 18, once receiving the hypermedia request via a content transfer tool as described previously, might contact another computer running the hypermedia request analysis system 40 to evaluate the hypermedia request. The content transfer tool 38 can then pass the hypermedia request over a network connection via any remote procedure call, HTTP request, network connection or other method to and from the hypermedia request analysis system 40. This allows separate computers to perform the tasks needed to evaluate the hypermedia request.

The HRRS 18 uses a hypermedia request analysis system 40, which can modify hypermedia requests using the hypermedia request redirection filter 54 by means of hypermedia request redirection logic 42. In an example of a hypermedia request redirection filter 54 that modifies hypermedia request URIs, the redirection filter might examine the URI itself and/or another element of the hypermedia request such as a cookie. A URI, or Uniform Resource Identifier, is a global resource identifier that is a character string used to identify a resource from a local machine, network attached machine or anywhere on the Internet by type and location. A URI does not necessarily refer to a remote resource, such as "file:///d:/somepath/file", while a URL, a subset of URIs, always refers to network addresses. A URL, or Uniform Resource Locator, comprises a scheme and scheme specific part as:

<scheme>:<scheme-specific-part>

In Hypertext Transfer Protocol, HTTP, an HTTP URL takes the form of:

http://<host>:<port>/<path>?<searchpart>

Similarly, for HTTPS, or HTTP secure, is as for HTTP except http becomes https. In the File Transfer Protocol, FTP, a FTP URL takes the form of:

ftp://<user>:<password>@<host>:<port>/<url-path>

The path portion of a URI can also be a virtual path. A virtual path is a sequence of names used to form a path to a file that might not be the actual path and name to a file. For instance, a file c:\example might also be shared as d:\a\b\c\anotherexample. Or a URL example "http://examplesite.com/a/../b/c/example" is synonymous to "http://examplesite.com/b/c/example" and returns the same file c:\example. The hypermedia request analysis system can contain logic to analyze virtual paths.

FIG. 18 is an example of a hypermedia request redirection filter 54 and blocker filter 58 expressed in logic that modifies a request for an Internet search by means of checking against lists of known search engines and their properties, such as flags and cookies that make the search engine perform a safe search, search engines that are always safe, non-supported search engines, and unknown search engines. First, the domain or address is extracted form the URI. If the domain or address is in a list of safe sites then the URI is not modified. If not, and it is in a list of blocked sites, then the URI is modified to point to a blocked location. Otherwise, a check is made to see if the site is to a non-supported safe search site, and if so, the URI is modified to point to a safe search site. If the URI is in a list of safe-search supported sites, then the search path, search flags, and cookies are extracted from the request. The safe search flag and cookie parameters for the domain of the URI are retrieved. The retrieval can be from a local file, database, or remote resource, and an update check can also be made if the retrieval is from a local resource. Next, if the URI does not contain a safe search flag supported by the domain, the URI is modified to contain the safe search flag. If the URI does not contain a safe search parameter in a cookie that is supported by the domain, then the cookie is modified to contain the safe search parameter. Finally, if the URI is not to a known search engine and the URI contains search parameters then the URI is modified to point to a safe search supported site. Search parameters can include "search", "q", "query", "find", or any other term used by a web server to initiate a search. The parameters can be stored locally or supplied in a dynamic update.

Now referring to FIG. 19, an example of safe search analysis, a hypermedia request comprising a URI "http://www.example.com/search?q=abc" would be checked to see if example.com was in a safe only search site. If the URI was a safe only site then the search would be safe. If not, then if example.com was in the "Always Block" list, then modify the URI to point to a blocked site. If the domain was not in the block list, then if example.com is in a list of non-safe search sites then modify the URI to point to a safe search site or blocked site. Otherwise, if the request is for a safe search supported site then retrieve the search path. Suppose the example.com is a safe search supported site with search path "search", safe search flag "safe=on" and safe cookie flag "safe=on". The URI path contains "search" but does not have a safe search flag or cookie set, so the URI is modified to "http://www.example.com/search?q=abc& safe=on". Alternatively, if supported, or instead of if the URI flag indicating safe search is not supported, a cookie might be created or modified in the hypermedia request that would include the safe search flag or different flag indicating a safe search. If "example.com" is not a known site, the hypermedia request redirection logic might be able to determine if the hypermedia request was for a possible search and block or redirect or modify the request. For example, the URI "http://www.example 2.com/query?q=abc", "example 2.com" is not known but the URI path "search" is a likely search. This path might be compared against a list of likely query strings such as, but not limited to, "search", "q", "query", "find", or any other term. In this case "query" is in the list of being a possible Internet search, but the site is unknown. So, the URI can be modified to a blocked site or the search terms, in this case "abc", could be extracted and passed to a known-safe search site example.com in the manner of "http://www.example.com/search?q=abc&safe=on". A site could support both URI and cookie based safe searches, in which case both could be checked and one or the other or both could be modified to force a safe search depending on the search engine and dynamically updated redirection logic.

Note that the terms, list of sites, and redirection logic or algorithm in whole or in part can be updated dynamically, synchronously, or asynchronously, allowing for a dynamically updated, forced safe search system. The example pseudo-code in no way limits the scope of the redirection logic. The redirection logic can be updated at any time.

In addition to the logic as described previously, search terms might be extracted or removed from a search query from a known search site or site that possibly contains a search. For example, a hypermedia request for "http://example 2.com/query?q=abc+xxx+def" contains the search terms "abc", "xxx", and "def". Example hypermedia request redirection logic can remove certain search terms from requests, as an example "xxx", so the URI becomes "http://example 2.com/query?q=abc+def". These search terms can also be located in a cookie which is modified to force safe searches.

In another example, a request for hypermedia on a hard drive or network mounted drive might be redirected. A file URI takes the form of "file://<host>/<path>". For example, A URI "file:///d:/somepath/file" might redirect the hypermedia request based on some logic to "file:///c:/file" or a URL like "http://www.example.com". Similarly, a URL can be redirected to a file, FTP, HTTPS, or other URI or location. The hypermedia request redirection logic is not just limited to URLs but can also be for URIs.

The domain examples described above are in no way limiting on the scope of the invention and are used to provide examples only and are not intended to conflict with any known site.

Hyperdocument Evaluation

This section describes the hypermedia document, or hyperdocument, evaluation system which may be used in conjunction with or instead of a hypermedia request routing system and method as previously described.

FIG. 1 is a system diagram showing a network 10 including an embodiment of a hyperdocument evaluation system ("HES") 18 in accordance with the present invention. The exemplary HES 18 is in communication with at least one requesting application 26 and is coupled to the network 10. For example, the HES 18 and requesting application 26 may be computer software located on a data retrieval device, such as a computer 12. As used throughout this patent, the term "computer", and variations thereof, mean a machine or device that can follow instructions to alter data in a desirable way to perform at least some operations without human intervention. Hyperdocuments 22 (or copies thereof) located at one or more information sources 30 are accessible to the HES 18 or requesting application via the network 10.

The illustrated network 10 is the Internet or World Wide Web 11, the structure and operation of which is generally known. However, the HES 18 of the present invention is not limited to use over the Internet but may be used in connection with any other communication or data exchange system capable of allowing the HES 18 access to hyperdocuments 22 or copies thereof. Some examples of other types of suitable networks are large area networks, wide area networks, value-added networks and TCP/IP networks. Alternately, the HES 18 need not be used over a network, such as when the hyperdocument is available to the HES 18 on a private network, local drive or media storage device.

Generally, information sources may be any locations accessible by the HES 18 or requesting application 26, such as databases, files, directories and file transfer or information storage devices. The information sources 30 of the example of FIG. 1 may be any location accessible over the network 10, such as electronic files stored on a PC or server (not shown).

Some examples of hyperdocuments 22 that may be provided over the network 10 in FIG. 1 are web pages 22a and files 20 that contain multiple hyperdocuments 22 (e.g. graphics files 22b and multimedia file 22c). The requesting application 26 may be any suitable information retrieval system, software, hardware or other mechanism capable of requesting a hyperdocument 22 and with which the HES 18 may communicate. In the example shown, the requesting application 26 is web browser software running on the computer 12. However, it should be understood that the present invention is not limited by the type, format, functionality or other characteristic of the hyperdocument, information source or requesting application.

The HES 18 may take any form of any combination of software and/or hardware capable of evaluating hyperdocuments with the use of one or more trained artificial neural networks and communicating with one or more requesting applications 26, and may be at any desired physical location or locations. As used throughout this patent, the designation "ANN" means at least one trained artificial neural network. For example, the HES may be software residing on a content server coupled with a web server, numerous servers, a PC in communication with a server, a computer running browser software coupled to the network 10 via a wide area network, a mainframe computer, a network device, a personal data assistant, a laptop computer, a hand-held device coupled to the network 10 via a wireless network, a point of presence (POP) device, a network-enabled telephone, an interactive or network-enabled television or any other suitable device(s) as is or becomes known, or a combination thereof. If desired, the HES 18 may be allocated, such as at one or more nodes (not shown), distributed on an intelligent network or any other suitable configuration. Depending upon the particular deployment of the HES 18, the overall communication link character connection topology and other communication link characteristics may differ.

The HES 18 or components thereof may be built into the requesting application 26 or an add-on to the requesting application 26, electronically transmittable, such as by download over the network 10, embedded on a diskette (not shown), CD (not shown), magnetic tape (not shown) or any other suitable media. It should be understood, however, that the present invention is not limited in any way by the above examples of formats, locations and configurations of the HES 18.

Still referring to FIG. 1, in accordance with an embodiment of a method of the present invention, a hyperdocument 22 requested by the requesting application 26 is provided to the HES 18 from an information source 30 via the network 10. Using an ANN, the HES 18 evaluates at least some of the content of the hyperdocument 22 to determine whether such content should be provided to the requesting application 26 (such as for display on a monitor 14), or any other desired destination(s). Based upon evaluation of the hyperdocument 22 by the HES 18, the hyperdocument 22 is disposed of accordingly. Some examples of possible "disposition actions", depending upon the particular embodiment and circumstances, are (i) providing the hyperdocument 22 in its original form, (ii) providing the hyperdocument 22 in a modified form, (iii) replacing all or part of the hyperdocument, (iv) not providing the hyperdocument, or multiple such actions depending upon the designated recipient(s).

Figure 20:
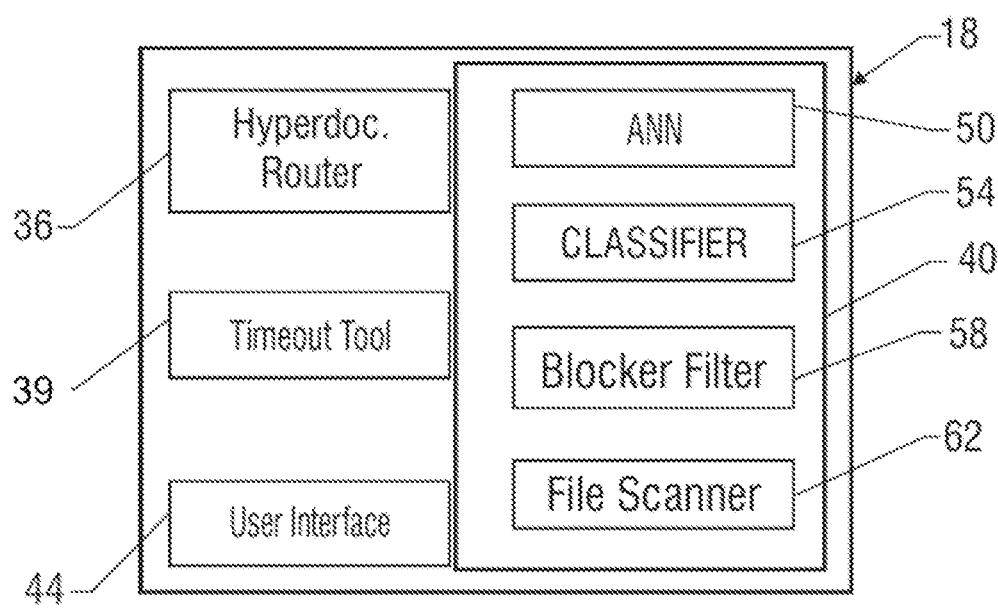
FIG. 20 is a block diagram illustrating various components of an embodiment of a hyperdocument evaluation system in accordance with the present invention.

Now referring to FIG. 20, the HES 18 may include any desired component or components. In the example shown, the HES includes a hyperdocument routing tool 36, timeout tool 39, content analysis system 40 and user interface 44. The illustrated content analysis system 40 includes an ANN 50, classifier 54, blocker filter 58 and file scanner 62. However, except for the ANN 50, these components are neither required for every embodiment nor limiting upon the present invention.

Figure 21:
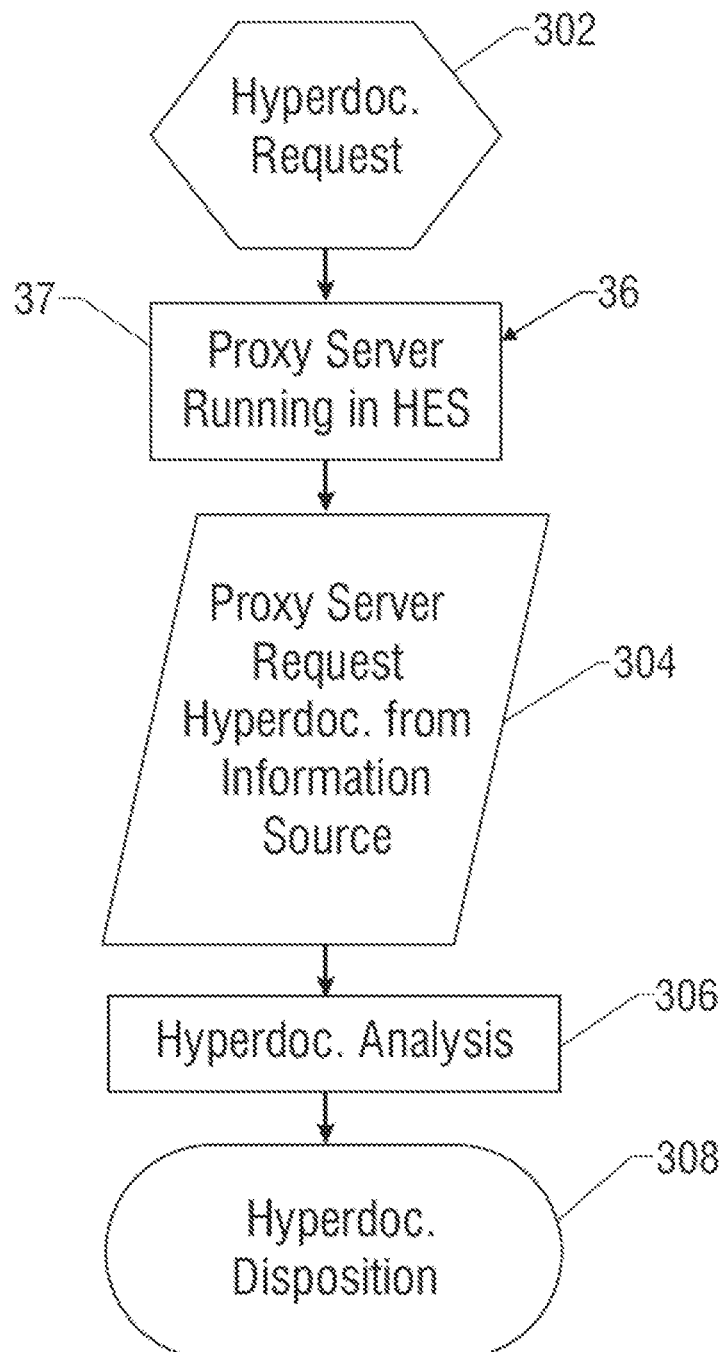
FIG. 21 is a flow diagram illustrating the process performed by an embodiment of a hyperdocument evaluation system that uses a proxy server in accordance with the present invention.

When included, the hyperdocument routing tool, or router, 36 may have any suitable desirable format and functionality as is or becomes known. In the embodiment of FIG. 21, the router 36 is a proxy server 37, which, if desired, may be any suitable commercially available proxy server. The exemplary proxy server 37 is software that receives a network address, URL or other source location address of a hyperdocument from a requesting application (Step 302). In Step 304, the proxy server 37 requests the hyperdocument from the Internet or other information source. After the proxy server 37 receives the hyperdocument, it passes the hyperdocument to the content analysis system for evaluation (Step 306) and routes the hyperdocument for disposition after such evaluation (Step 308).

Figure 22:
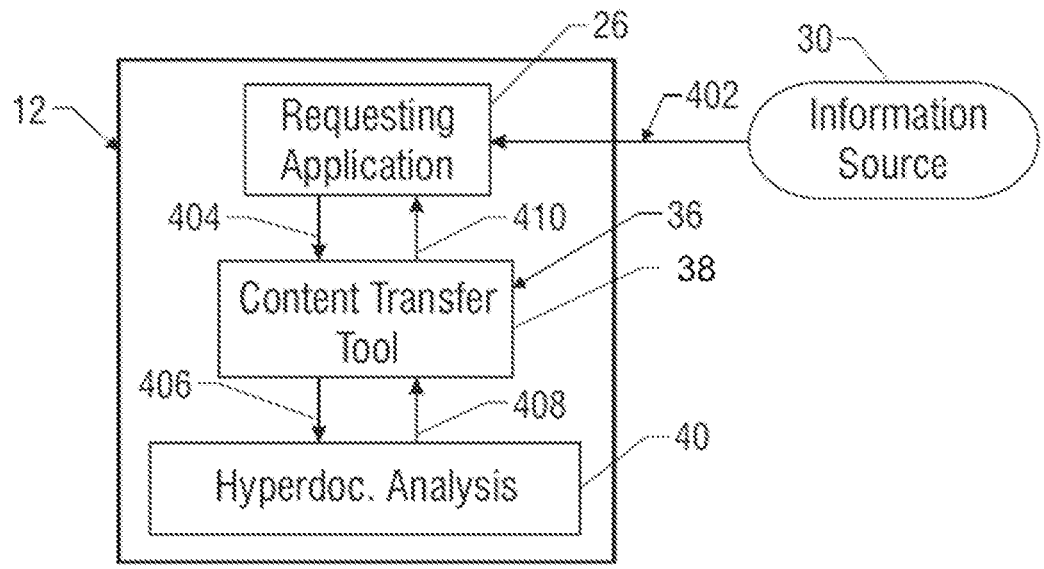
FIG. 22 is a flow diagram illustrating the process performed by an embodiment of a hyperdocument evaluation system that uses a content transfer tool in accordance with the present invention.

In the embodiment of FIG. 22, the hyperdocument router 36 is a content transfer tool 38. In this example, the content transfer tool 38 is software that is a direct plug-in to the requesting application 26, such as a web browser, which is located on an electronic device, such as a computer 12, along with the HES 18. The content transfer tool 38 may, if desired, be any suitable media filter, image filter, MIME-type filter or the like, which is or may be commercially available. In Step 402, the requesting application 26 receives a hyperdocument from one or more information sources 30 as the result of a network request (such as for a URL), file transfer, copy or other form of information retrieval procedure. The requesting application 26 passes content of the hyperdocument to the content transfer tool 38 (Step 404). The content transfer tool 38 then passes such content to the content analysis system 40 of the HES 18, which is already running on the computer 12 (Step 406). After the content analysis system 40 evaluates the content and passes the content back to the content transfer tool (Step 408), the content transfer tool 38 disposes of the original or modified hyperdocument appropriately. For example, the content transfer tool 38 may send the original or modified hyperdocument back to the requesting application 26 (Step 410). In other embodiments, the content transfer tool 38 may not be part of HES 18 but could instead be initiated by the requesting application 26 as a shared object and communicate with the HES by invoking methods on the shared object.

The timeout tool 39, if included, is used to temporarily stop the evaluation of hyperdocuments by the HES 18. Note that the timeout tool 39 may be use with the HES, HRRS, or any combination of thereof. When the timeout tool 39 is activated, hyperdocuments requested by the requesting application 26 are not evaluated by the HES 18 and are provided to the desired recipient(s) unchanged. The timeout tool 39 may have any desired capabilities and format. For example, referring again to FIG. 11, an embodiment of a timeout user interface 68 for an exemplary timeout tool of a presently commercially available HES 18 known as the Photo No-No™ system Version 1.4 (referred to herein as "Photo No-No"), is shown. Publicly available written materials relating to Photo No-No, a pornographic image filter, including the web screens and information available at www.photonono.com are hereby incorporated herein by reference in their entireties.

Still referring to FIG. 11, the interface 68 includes a timeout clock controller 70. The illustrated timeout clock controller 70 may be user-set and changed by dragging a timeout pointer 72 or with the use of arrow keys on a keyboard or keypad associated with the interface 68. The pointer 72 is thus set by the user to establish the duration of the timeout period, which automatically starts the timeout clock. Thereafter, the pointer 72 automatically moves down the illustrated face of the controller 70 to the bottom, when the timeout ends. A corresponding time remaining indicator 74 displays the same information as the controller 70 (the amount of time remaining in the timeout) and similarly changes in real time. A timeout end time indicator 76 displays the actual end time of the timeout session. At any time, even during a timeout, the user can move the pointer 72 to reset the timeout, which automatically adjusts the time remaining indicator 74 and timeout end time indicator 76. When the timeout period ends, the HES 18 automatically resumes hyperdocument evaluation for future requests by the requesting application 26. When both HES and HRRS are under the timer filter, when the timeout ends, both resume.

The blocker filter 58 may have any desired form, format and capabilities and operate as is or becomes known. The exemplary blocker filter is software and may be any suitable commercially available blocker filter. When activated, the blocker filter 58 compares an incoming hyperdocument's source location to a list of disallowed information sources, addresses or other identifying indicia. In the present embodiment, the blocker filter 58 uses fast lookup methods for comparing the hyperdocument source location and subsets of that location (such as a URL specific location) to an "Always Block" list.

Referring again to FIG. 10, shows an example blocker filter user interface 80 relating to an "Always Block" list. If a match is found, an appropriate disposition action takes place, such as the requesting application (or other designated destination(s)) being provided with a hyperdocument that is entirely or partially replaced with designated data. For example, the following text could be displayed when the user attempts to access a blocked hyperdocument:

Photo No-No! Blocked Site

The site was blocked by Photo No-No!

In this embodiment, if the hyperdocument's source location is not on the "Always Block" list, the hyperdocument is passed to another component of the HES 18 for further analysis or evaluation.

If desired, the blocker filter 58 may also or instead compare the incoming hyperdocument's source location to a list of allowed information sources, addresses or other identifying indicia. This operation would be similar to the operation described above with respect to the "Always Block" list, except the list would be an "Always Allow" list and the opposite actions as those described above upon would occur.

Figure 23:
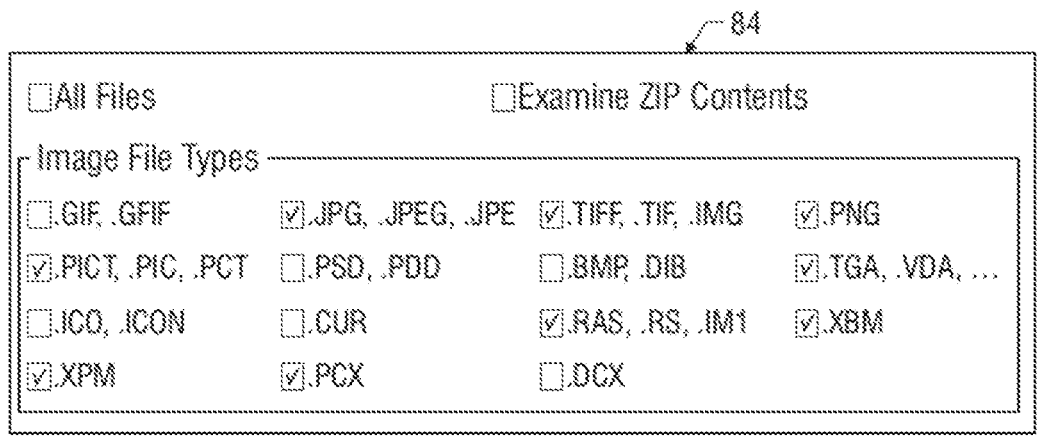
FIG. 23 is an embodiment of a hyperdocument type selection user interface useful with an embodiment of a hyperdocument evaluation system in accordance with the present invention.
Figure 24:
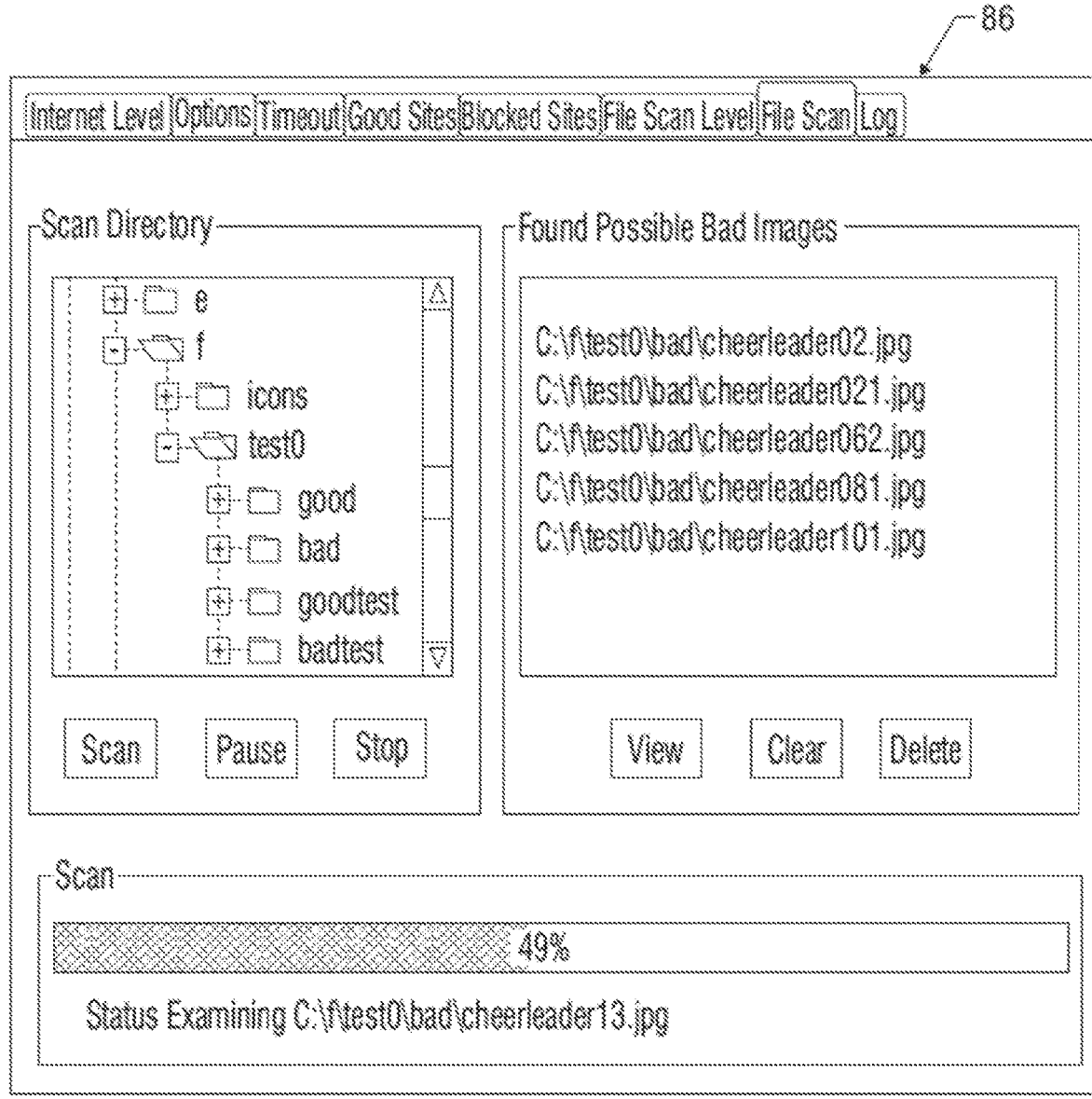
FIG. 24 is an embodiment of a file scanner user interface useful with an embodiment of a hyperdocument evaluation system in accordance with the present invention.

The file scanner 62, when included, may have any desired form, format and capabilities and operate as is or becomes known, and may be any suitable commercially available file scanner. The exemplary file scanner 62 is software which, when activated, scans a selected disk, directory, or other information source of data for hyperdocuments that are of a type designated by the user for evaluation by the HES 18. (FIG. 23 shows an example hyperdocument type selection user interface 84 for use in evaluating image-type hyperdocuments. In such example, the user can select what types of images are to be evaluated.) For each file in the designated source location having one or more hyperdocuments of a designated type, the hyperdocuments are evaluated by the HES 18. If desired, the results of the HES evaluation may be shown or saved. For example, FIG. 24 illustrates an example file scanner user interface 86. If an option to request file scan logging is provided and selected, the file scanner 62 logs the desired information (e.g. file name, location and other properties). Note that the file may be a compilation of hyperdocument files, such as a compressed or archived file (e.g. ZIP, TAR, etc.) and may not be a hyperdocument itself (e.g. Microsoft Word document or Adobe pdf file) but which contains one or more hyperdocuments.

Figure 25:
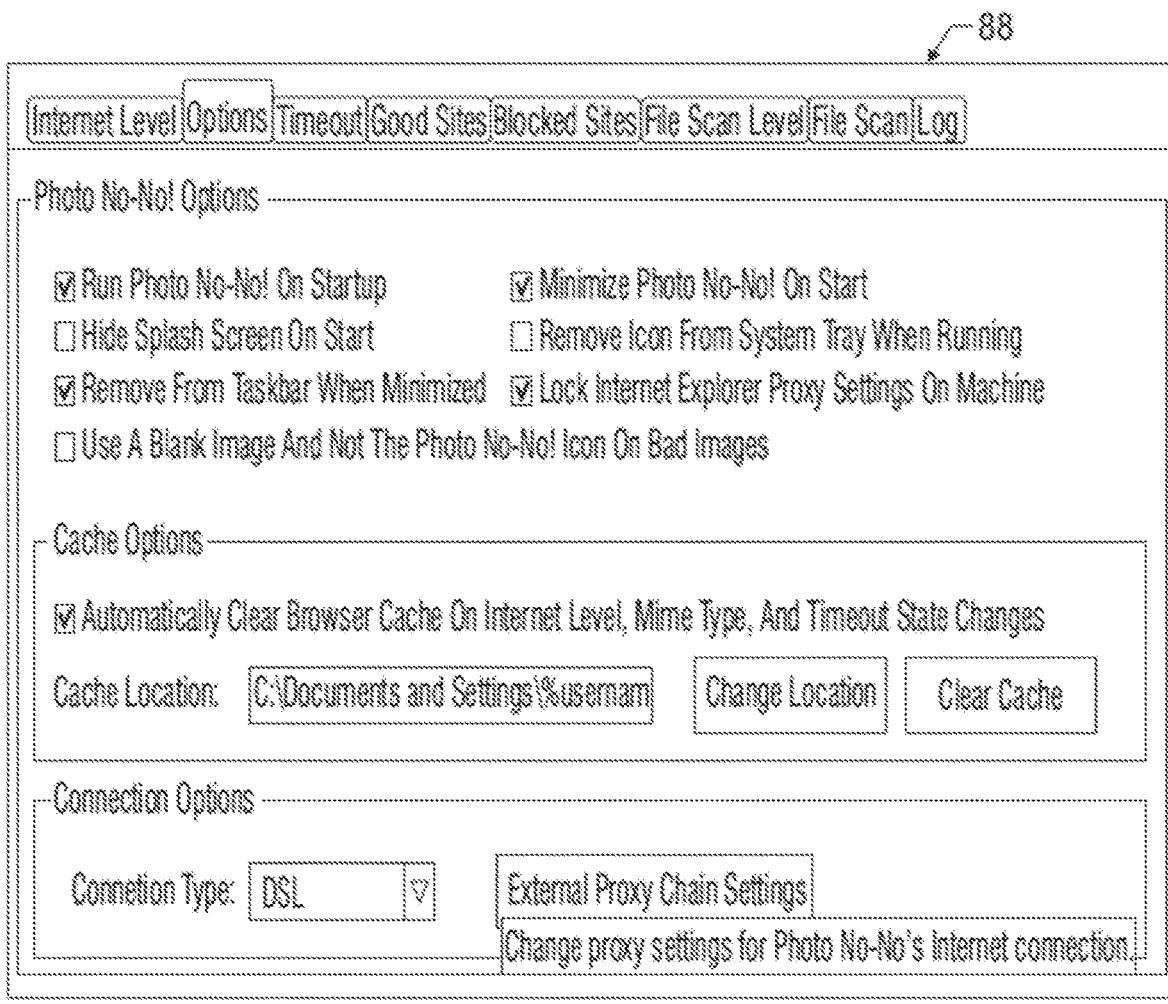
FIG. 25 is an embodiment of a user options user interface useful with an embodiment of a hyperdocument evaluation system in accordance with the present invention.
Figure 26:
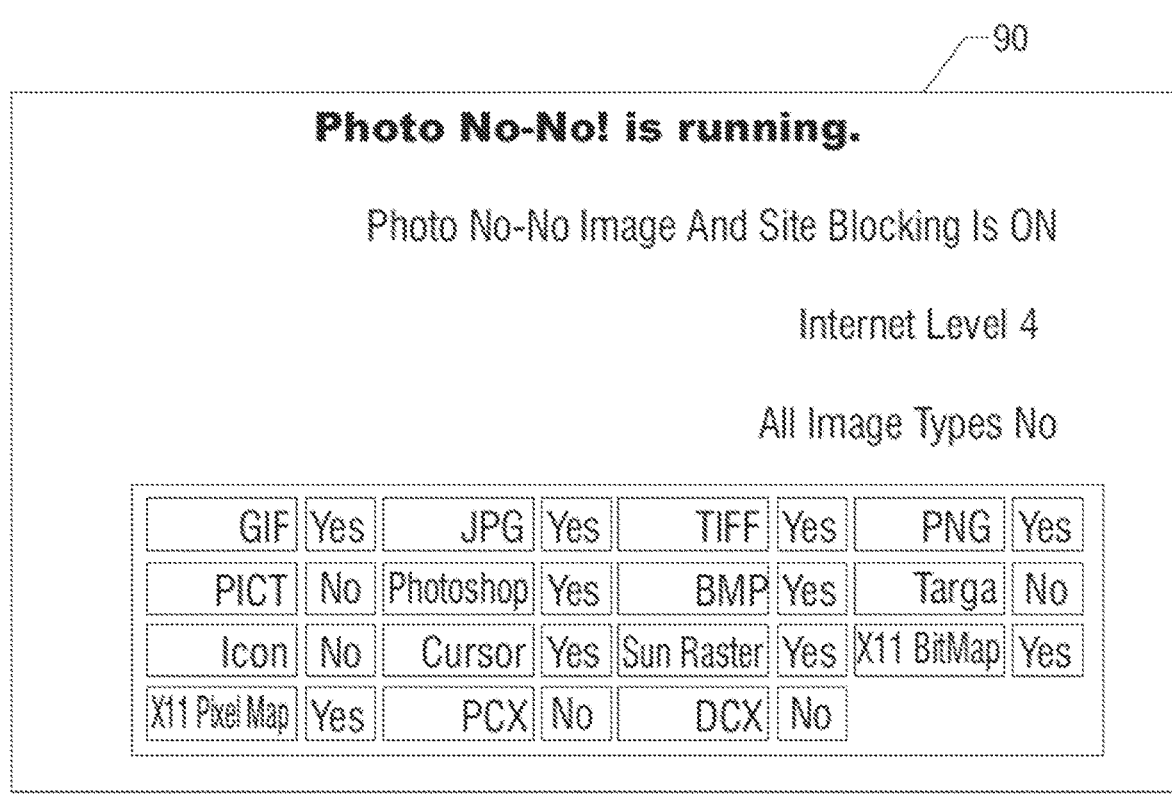
FIG. 26 is an embodiment of a summary page screen display useful with an embodiment of a hyperdocument evaluation system in accordance with the present invention.

When included, the user interface 44 may have any suitable format, capabilities and functionality. For example, the user interface 44 may be at least one graphical user interface or command line interface for user-guided management of the HES 18 and/or for providing information. Example user-guided preferences are settings for the setup and operation of aforementioned and below described components. FIGS. 10, 11, 23-26 and 30 herein provide examples of possible user interfaces 44. (FIG. 25 provides an example of a user interface options screen 88 and FIG. 26 provides a summary page 90.)

The classifier 54, when included, may serve any desired functions. In the present embodiment, the classifier 54 interacts with the ANN 50. For example, the classifier 54 may screen the requested hyperdocument-based words, phrases, images or other types of information. In the illustrated embodiment, the classifier 54 determines whether the requested hyperdocument is of a type designated for evaluation by the HES 18 (See FIG. 23). Depending upon the input requirements of the ANN 50, the classifier 54 may format or modify the hyperdocument for review by the ANN 50, or generate necessary input data for the ANN 50. For example, the illustrated classifier 54 is capable of converting hyperdocument image data into input values for the ANN by scaling, color analysis and/or ordering. The classifier 54 may also receive the output of the ANN, and based thereupon, determine the ultimate disposition of the hyperdocument and/or communicate with other components of the HES 18.

Figure 27:
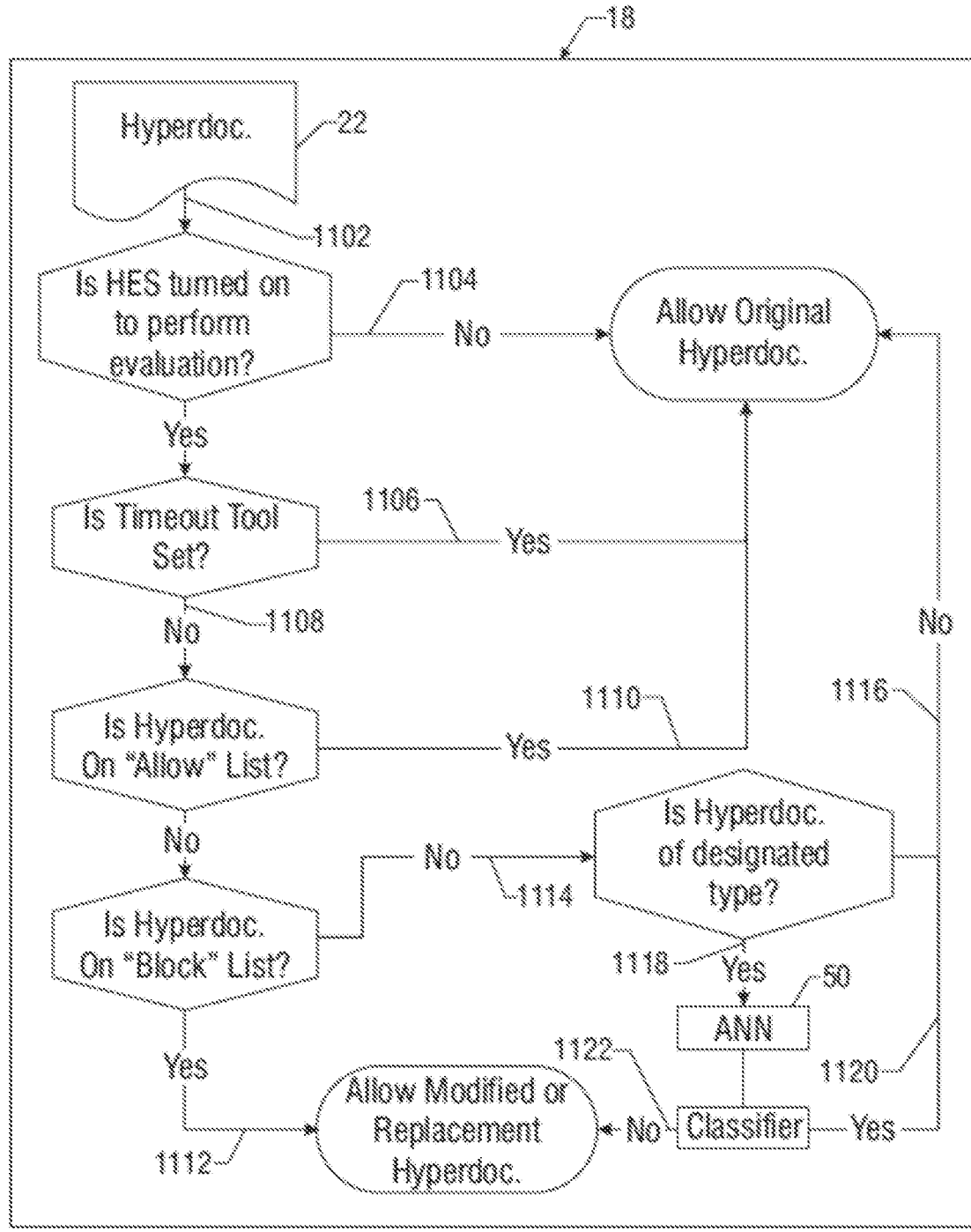
FIG. 27 is a flow diagram illustrating the process performed by an embodiment of a hyperdocument evaluation system in accordance with the present invention.

Now referring to FIG. 27, an embodiment of a method of operation of a HES 18 in accordance with the present invention is shown. In Step 1102, a hyperdocument 22 is provided to the HES 18. If the HES 18 is "off" (Step 1104) or a timeout tool has been activated (Step 1106), then the original hyperdocument is allowed to the designated recipient(s) unchanged. If the timeout tool is not set, the hyperdocument is passed to a blocker filter (Step 1108). If the hyperdocument is found on an "Always Allow" list, then the original hyperdocument is allowed to the designated recipient(s) unchanged (Step 1110). If the hyperdocument is found on an "Always Block" list, a modified or replacement hyperdocument, no hyperdocument or other data (as desired) is provided to the designated recipient(s) (Step 1112).

Sill referring to FIG. 27, if the hyperdocument is not on either list, the hyperdocument is passed to the classifier 54 (Step 1114) for determination of whether it is of a type designated for evaluation (See FIG. 23). If not, the original hyperdocument is allowed to the designated recipient(s) unchanged (Step 1116). If the hyperdocument is of a type designated to be evaluated, the appropriate data is provided to the ANN 50 for analysis of the hyperdocument (Step 1118). The output of the ANN 50 is provided back to the classifier 54 for determination of the disposition action to be taken (Steps 1120, 1122).

The HES 18 evaluates hyperdocuments in any manner, for any purpose and with any criteria as desired. For example, the HES may be designed to determine if a hyperdocument should be sent to one or more recipients based upon criteria assigned to each recipient. For another example, the HES may be designed to determine whether content of the hyperdocument is allowable for viewing by one or more recipients. In some embodiments, the hyperdocument or its content may be graded and categorized among multiple categories or based on specific criteria, upon which the final decision of whether and what to allow is based. The selection criteria, which, if desired, could be set by a user, may be based upon words, phrases, images and/or other types of information in the hyperdocument or the nature of content in the hyperdocument.

Figure 28:
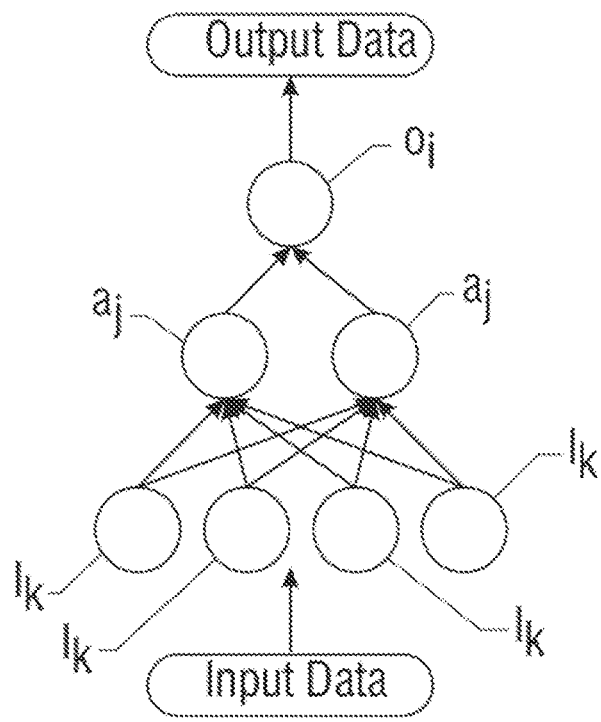
FIG. 28 is a flow diagram illustrating the general flow of data through an example feed-forward type artificial neural network.

The HES 18 of the present invention utilizes one or more trained artificial neural networks to assist in evaluating hyperdocuments. For background purposes, generally, an artificial neural network may be used to derive meaning from complicated data and be used to formulate or extract patterns and trends that may be highly complicated. An artificial neural network learns by example, wherein example data is used to train the artificial neural network by adjusting the weights of data importance into each neuron or node of the artificial neural network. An example artificial neural network is displayed in FIG. 28. This artificial neural network includes an input layer of four nodes $I_k$, one hidden layer of two nodes $a_j$ and an output layer $O_i$ of a single node. Input layers are layers of nodes $I_k$ that take input data, process and send it to the hidden layer. Output nodes $O_i$ take data from input nodes or hidden nodes, process the data and send output data. Hidden layers are groups of hidden nodes $a_j$ that process data internally. The hidden nodes do not receive input data and do not send output data. In this example, connections between the layers of nodes are allowed in only one direction (e.g. from the input layer to the next layer and so on), which is sometimes referred to as "feed-forward."

Data in this example artificial neural network is expressed as double precision floating point numbers. The data from a hidden or output node of this artificial neural network is referred to as the node's activation function, which relates to the data it receives and the weight, or importance, of such data. One example activation function is the sigmoid function expressed as:

$$a_j=1/(1+e^{-x}) \text{ where } x=E_k W_{kj} * I_k \text{ and } k=1 \ldots n$$

Given a set of inputs, this sigmoid activation function will produce a non-linear output distribution between 0 and 1.

Training an artificial neural network can be performed by various methods in order to compute the weights ($W_{kj}$) of the hidden nodes, and the weights ($W_{ji}$) of the output nodes. In the back-propagation method, for example, the output of the artificial neural network is compared to the desired output of the artificial neural network. The weight of each input to hidden node and weight of each hidden to output node may be updated in an amount proportional to the error at that node multiplied by the output of the node that is feeding into the weight so that the artificial neural network better represents the overall accuracy of the artificial neural network.

An example application of an artificial neural network is pattern recognition. Pattern recognition can be implemented using a feed-forward artificial neural network and training it on example data containing the patterns that will be recognized. This training process causes the artificial neural network to associate output values with input patterns. When data is fed into the artificial neural network, the artificial neural network tries to identify the input pattern and provide the associated output value for that input pattern. When input data not associated with a previously trained pattern is fed into the artificial neural network, the artificial neural network produces an output value that corresponds to the trained input pattern category value that is the closest match. The overall accuracy of the artificial neural network can be expressed in terms of its accuracy in matching input patterns with the desired output value. Hidden layers add to the overall accuracy of the artificial neural network by learning to provide a representation for the input data. More hidden nodes and hidden layers increases accuracy to a given point by increasing the number of representations for the input data. It should be noted that the above discussion of artificial neural networks is provided for background purposes only and should not be limiting upon the present invention or appended claims.

In accordance with the present invention, at least one ANN 50 analyzes the hyperdocument(s) 22 being evaluated by the HES 18. In the illustrated embodiment, the HES 18 includes an ANN 50 trained for analysis of hyperdocuments that are electronic images. In this embodiment, the ANN 50 is a feed-forward artificial neural network having three layers with 16,384 input nodes, a single hidden layer having 64 hidden nodes and one output node. The activation function used in this ANN 50 is the sigmoid activation function mentioned above and the inputs and outputs of this ANN are represented by double precision floating point value numbers.

Figure 29:
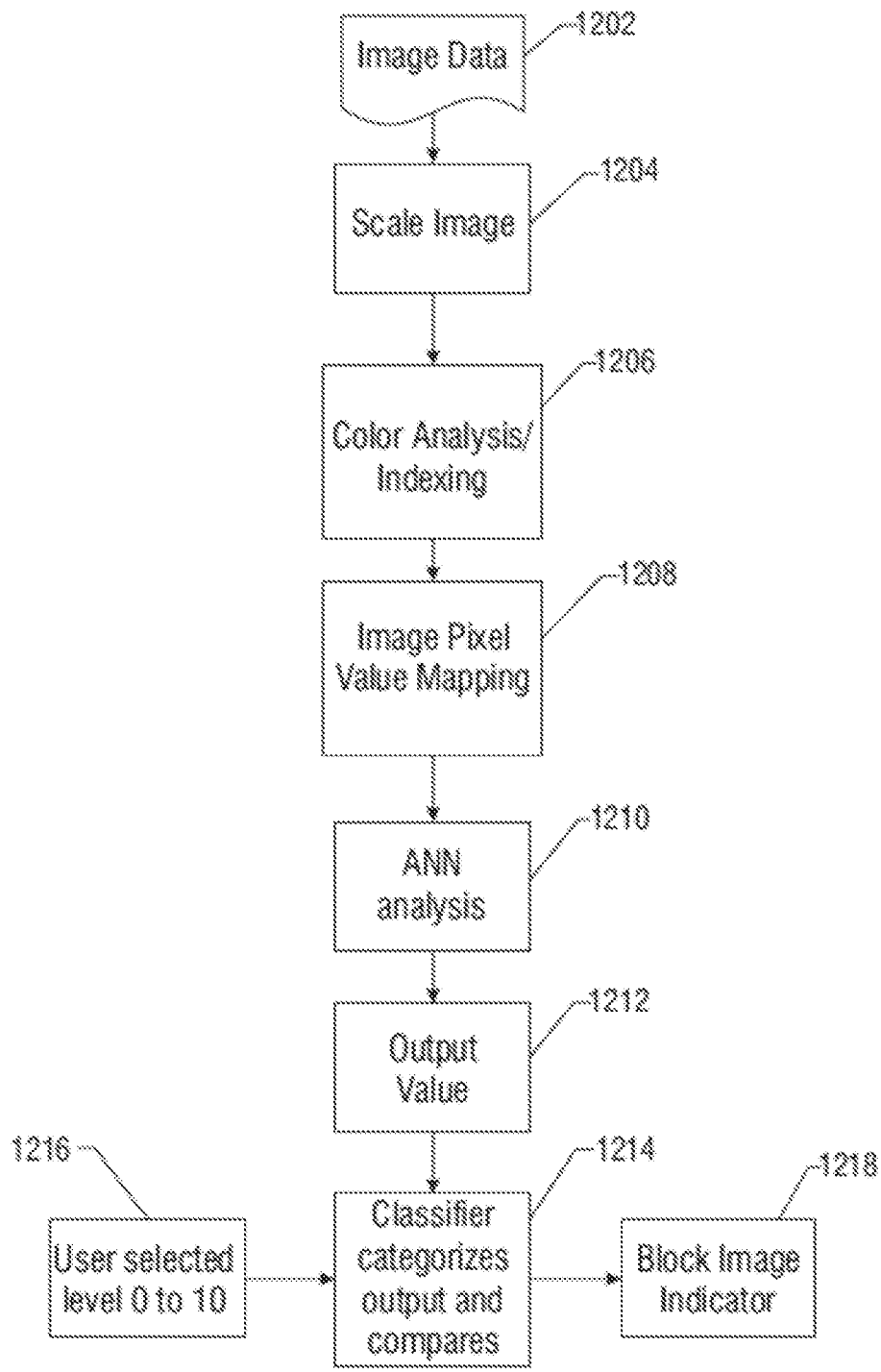
FIG. 29 is a flow diagram illustrating the process performed by an embodiment of a hyperdocument evaluation system that uses an embodiment of a classifier in accordance with the present invention.

Referring to FIG. 29, in this embodiment, each hyperdocument image is provided to the HES 18 as a bitmap of image data with color values for each pixel (Step 1202). Images analyzed by this ANN 50 must be 128 pixels×128 pixels. The 128×128 dimension has 16,384 pixels, the same as the number of input nodes in the ANN 50. Thus, one pixel value represents a single input node of the ANN 50. The images may be scaled to this size using any suitable technique. For example, images may be scaled by the classifier 54 to the (128×128) pixel size using the standard averaging scaling technique (Step 1204).

Also, for this embodiment, the pixel color values for the image are converted into a double precision floating point value by the classifier 54 for input into the ANN 50 (Step 1206). Any suitable technique may be used for such color analysis and indexing. For example, when the pixel color value is provided as individual color values for Red, Green, and Blue (RGB value) with a byte (0 to 255) of data for each color (16,581,375 different colors are possible), each pixel's RGB value may be indexed into a smaller set of known colors then divided by the size of the set. The result is a decimal value number, which will serve as the double precision floating point value for that pixel. For example, the standard Super Video Graphics Adapter (SVGA) color palette may be used. This color set includes 256 color values equally distributed across the 16,581,375 RGB color value spectrum. A standard color dither may be used to map the RGB value of a pixel to a SVGA color by determining the closest color match. Once the color in the SVGA color set is determined, the index into the SVGA color set is provided as a value from 0 to 255. That value is then divided by 256 to compute a double precision floating point value for that pixel.

Still referring to the embodiment of FIG. 29, the classifier 54 of this example maps all the pixels of the image to the 16,384 input nodes of the ANN 50 by row first ordering (Step 1208). Thus, the double precision floating point value for each pixel is used as an input node of the ANN 50. Accordingly, there are 16,384 input nodes denoted by $I_k$, where k is between 1 and 16,384. The ANN 50 of this embodiment then takes each input node's value and propagates it through the hidden layer (each hidden node) and the output layer (Step 1210). In the present Photo No-No embodiment, based upon its own criteria, each hidden node analyzes all incoming pixel values to determine whether the image is "good" or "bad" and sends an appropriate value to the output layer. The output layer performs a similar analysis. These analyses involve variables relating to whether and to what extent the image has pornographic subject matter. Example variables are the inclusion, location and grouping of colors.

The value of each hidden node, denoted by $a_j$, where j is 1 to 64, is calculated using the sigmoid activation function:

$$a_j=1/(1+e^{-x}) \text{ where } x=E_k W_{kj} * I_k \text{ and } k=1 \ldots, 16{,}384$$

Then, the value of the output node, $O_1$, is calculated (Step 1212) using the sigmoid activation function:

$$O_1=1/(1+e^{-x}) \text{ where } x=E_j W_{ji} * a_j \text{ and } j=1 \ldots 64$$

Each output value $O_1$ of this ANN 50 is a double precision floating point value.

Still referring to FIG. 29, in this embodiment, the classifier 54 receives the output value of the ANN 50 and classifies it into one of eleven categories denoted as categories 0 to 10 (Step 1214) based upon the likelihood the image has pornographic content. To associate an output value of the ANN 50 with a category among 0-10, the ANN output value serves as a probability that the image is either "good" or "bad." A "good" (most desirable) image has an output value closer to 0 and a "bad" (least desirable) image has an output value closer to 1. Thus, category "0" includes images deemed by the ANN 50 to be least likely to include any pornographic content while category "10" would include images deemed by the ANN 50 to be most likely to include pornographic content, with the middle categories 1-9 scaled therebetween. The closer an image's category is to "10", the more likely the image has pornographic content. In this example, the user can choose to view hyperdocuments in any such category. The classifier 54 of this example compares such category level (Step 1214) to a user-selected desired category among 0 to 10 (Step 1216), thereafter indicating whether or not the image should be blocked (Step 1218).

Figure 30:
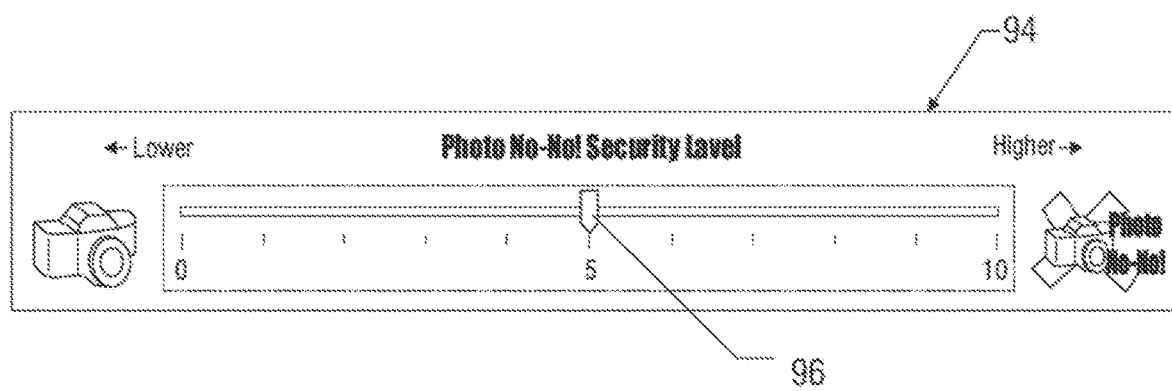
FIG. 30 is an embodiment of a category selection user interface useful with an embodiment of a hyperdocument evaluation system in accordance with the present invention.

An example category selection user interface 94 is shown in FIG. 30. This interface includes a category pointer 96 movable by a user between category settings 0, 1, 2, 3 . . . 10. These settings represent the desired level of screening pornographic material from hyperdocument images to be allowed on the same scale as mentioned above.

The exemplary classifier 54 then signals the content analysis system 40 with the command "yes block" or "no do not block". The content analysis system 40 will modify, replace or not modify the hyperdocument and take the desired disposition action, such as sending the hyperdocument to the hyperdocument router 36 and on to the requesting application 26. If desired, modification of the hyperdocument may be set by the user, such as by selecting an image to replace any blocked images in requested hyperdocuments.

Any technique may be used to correspond the range of possible ANN output values with the eleven categories. For example, referring to the tradeoff matrix of FIG. 31, the classifier 54 could formulate individual threshold values 98 of the possible double precision floating point value outputs of the ANN for each of the eleven categories 100. In this embodiment, a threshold value 98 is a value between 0-1, whereby if the ANN output value is less than or equal to the threshold value, the image is considered less likely to contain pornographic material. If the ANN output value is greater than the threshold value, the image is considered more likely to contain pornographic material.

Figure 33:
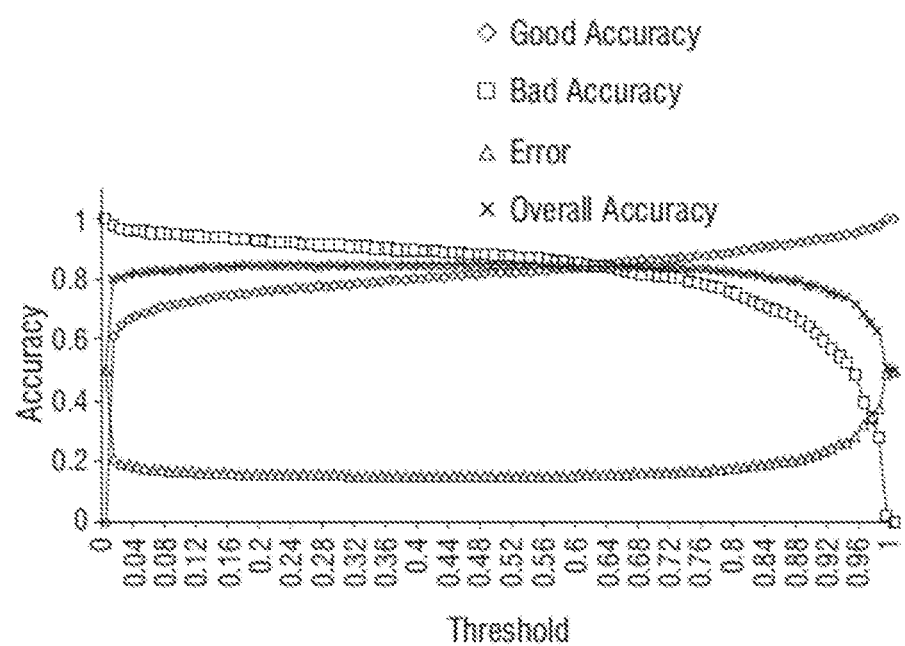
FIG. 33 is a graph showing example accuracy data of an embodiment of an artificial neural network used in an embodiment of a hyperdocument evaluation system in accordance with the present invention.

To calculate the threshold values, the exemplary classifier 54 examines the Overall Accuracy of the ANN. For example, the tradeoff between "Good Accuracy" 102 and "Bad Accuracy" 104 on the Overall Accuracy of the ANN 50 may be considered. Good Accuracy is the percentage of times the HES 18 was correct at concluding that an image did not contain pornographic material at a particular category level. Bad Accuracy is the percentage of times the HES 18 was correct at concluding that an image did contain pornographic material at a particular category level. FIG. 33 illustrates an example of the tradeoff of threshold settings on Overall Accuracy of the ANN as it affects Good and Bad Accuracy. In this embodiment, setting a higher threshold increases the Good Accuracy, as more images are identified as "good" (not containing pornographic material) since the ANN output value has a higher probability of being less than or equal to the threshold value, while at the same time decreasing the Bad Accuracy. Likewise, lowering a threshold value increases the Bad Accuracy since the ANN output value has a higher probability of being greater than the threshold, while at the same time decreasing the Good Accuracy. Determining the best threshold value for each user level category in this example depends upon the Overall Accuracy of the ANN 50 taking into account the tradeoff between Good Accuracy and Bad Accuracy. The Overall Accuracy for each category threshold value of this example is shown in FIG. 31 as the "Rule" 108.

In this embodiment, if the output value from the ANN is less than or equal to the threshold value corresponding to the user selected category, then the image is considered "good" (not likely to contain pornographic content) and a Block Image Indicator is set to allow the image to be provided. If the output value from the ANN is greater than the threshold value for the user selected category, the image is considered "bad" (likely to contain pornographic content) and the Block Image Indicator is set to block the image.

Figure 32:
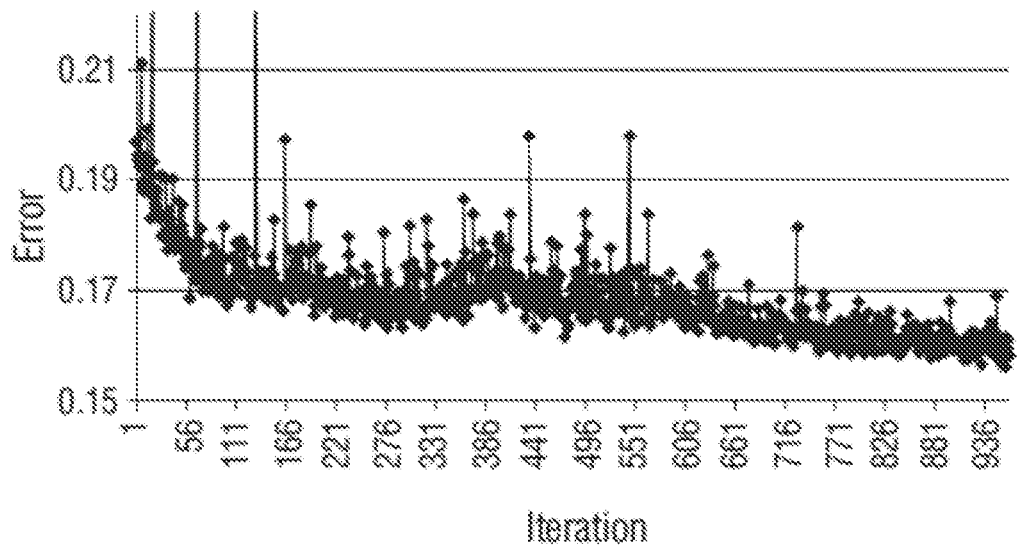
FIG. 32 is a graph showing example error data during training of an example artificial neural network used in an embodiment of a hyperdocument evaluation system in accordance with the present invention.

The ANN 50 of this embodiment has been trained on hundreds of thousands of images that have been classified by hand into "good" and "bad" sets. Each set was randomly divided into training images and test images in order to have an independent test set. Training this ANN on an individual image was performed by back propagation as briefly described above, comparing the desired output of the ANN with the expected output, 0 for "good" and 1 for "bad". The ANN was trained in multiple iterations or epochs. For each epoch, the ANN was trained on "good" and "bad" images (at random from each set) until a certain number of images, specified at the start of the training, was reached. After each epoch, the ANN was tested on each image in the utilized test set of both "good" and "bad" images. The Overall, Good and Bad Accuracies were then computed and saved. After a certain number of training epochs, the ANN was believed to become more accurate. The ANN was saved after each epoch and an ANN believed to have the highest Overall Accuracy was selected for use in the HES 18. The present Photo No-No embodiment was trained millions of times on thousands of images in each epoch, yielding increasing Overall Accuracy and decreasing error as outlined in FIG. 32.

Various components discussed above include software routines or modules. Such software routines or modules are executable on corresponding control units. The various control units include microprocessors, microcontrollers, or other control or computing devices. The software routines or modules are stored as instructions in one or more storage modules. Instructions that make up the various software routines or modules when executed by a respective control unit cause the corresponding device or system to perform programmed acts.

The storage modules referred to in this discussion include at least one machine-readable storage media for storing data and instructions. The storage media may include different forms of memory including semiconductor memory devices, such as dynamic or static random access memories (DRAMs or SRAMs), erasable and programmable read-only memories (EPROMs), electrically erasable and programmable read-only memories (EEPROMs), flash memories such as Flash ROMS; non-volatile ROM; RAM; magnetic disks, such as fixed, floppy and removable disks; other magnetic media including tape; or optical media such as compact disks (CDs) or digital video disks (DVDs).

Preferred embodiments of the present invention thus offer advantages over the prior art and are well adapted to carry out one or more of the objects of the invention. It should be understood that all of the above components and any other components that may be included may have any suitable, desired size, material construction, configuration, form and quantity, as is or becomes known. The present invention is in no way limited to the methods, steps, components, configurations, dimensions, specific examples or other details described above or shown in the attached figures. Further, the above-described features are not limited to the details as described and shown. Yet further, each such feature can be used independent of any other feature. Moreover, the present invention does not require each of the above features and includes further capabilities, functions, methods, uses and applications, as will be apparent to a person skilled in the art based upon the description above and the appended drawings and claims.

Further, the methods described above need be performed in any particular order, such as the order provided above, except to the extent necessary for operability of the invention. In the description above and the appended method claims, the methods need not necessarily be performed in the order listed. Thus, the appended method claims are not limited to the particular order recited in the claims. Yet further, the methods of the present invention and the appended claims do not require use of the particular embodiments and configurations and details shown and described in the present specification and the appended figures.

While preferred embodiments of this invention have been shown and described, many variations, modifications and/or changes, such as in the components, details of construction and operation, arrangement of parts and/or methods of use, are possible, contemplated by the patentee, within the scope of the appended claims, and may be made and used by one of ordinary skill in the art without departing from the spirit or teachings of the invention and scope of appended claims. Thus, all matter herein set forth or shown in the accompanying drawings should thus be interpreted as illustrative and not limiting. Accordingly, the scope of the invention and the appended claims is not limited to the embodiments described and shown herein.

The invention claimed is:

1. A system for determining the disposition of a hyperdocument using a trained artificial neural network, the system comprising:
    an information source component, wherein the information represents RGB pixel color data;
    a content transfer component;
    a component requesting information from the information source component through the content transfer component; and
    a computer server component having one or more processors containing a trained artificial neural network having one or more hidden nodes and one or more hidden layers capable of evaluating the information from the information source component with the computer server configured to:
        receive RGB pixel color data from the content transfer component;
        dither the RGB pixel color data to a color palette;
        create inputs to the artificial neural network using the dithered pixels;
        evaluate the artificial neural network using a sigmoid activation function;
        categorize the output value from the evaluation of the artificial neural network;
        and return data to the content transfer component based on the category of the output value.

2. The system of claim 1 wherein the content transfer component is a plugin to a requesting application.

3. The system of claim 1 wherein the content transfer component is a shared object.

4. The system of claim 1 wherein the content transfer component is an operating system level hook.

5. The system of claim 1 wherein the content transfer component is a file system.

6. The system of claim 1 wherein the content transfer component is a computer network.

7. The system of claim 1 wherein the component requesting information is a computer server.

8. The system of claim 1 wherein the component requesting information is a web browser and the information source component further provides a Uniform Resource Locator.

9. A system for modifying hyperdocument requests using a trained artificial neural network, the system comprising:
    an information source component, wherein the information represents RGB pixel color data;
    a content transfer component;
    a component requesting information from the information source component through the content transfer component; and
    a computer server component having one or more processors containing a trained artificial neural network having one or more hidden nodes and one or more hidden layers capable of evaluating the information from the information source component with the computer server configured to:
        receive information source location data from the content transfer component;
        receive RGB pixel color data from the content transfer component;
        dither the RGB pixel color data to a color palette;
        create inputs to the artificial neural network using the dithered pixels;
        evaluate the artificial neural network using a sigmoid activation function;
        categorize the output value from the evaluation of the artificial neural network;
        and return data to the content transfer component based on the category of the output value.

10. The system of claim 9 wherein the content transfer component is a plugin to a requesting application.

11. The system of claim 9 wherein the content transfer component is an operating system level hook.

12. The system of claim 9 wherein the component requesting information is a computer server.

13. The system of claim 9 wherein the information source location data includes a Uniform Resource Locator.

14. The system of claim 13 wherein the data returned to the content transfer component includes modifications to the Uniform Resource Locator.

15. The system of claim 13 wherein the information source location data further includes one or more user cookies.

16. The system of claim 15 wherein the data returned to the content transfer component includes modifications to one or more user cookies.

17. A computer implemented method for modifying hypermedia requests using a trained artificial neural network, the method comprising:
    receiving a hypermedia request by a content transfer component from a requesting application for hypermedia from a first information source component, wherein the hypermedia request is in the form of a Uniform Resource Locator (URL) and zero or more user cookies;
    obtaining RGB pixel color data from the first information source component using a content transfer component;
    providing information about the hypermedia request and RGB pixel color data to an analysis system containing a trained artificial neural network having one or more hidden nodes and one or more hidden layers capable of evaluating the information from the first information source component;

upon the analysis system receiving RGB pixel color data:
  dithering the RGB pixel color data to a color palette;
  creating inputs to the artificial neural network using the dithered pixels;
  evaluating the artificial neural network using a sigmoid activation function;
  categorize the output value from the evaluation of the artificial neural network;
  and returning data to the content transfer component based on the category of the output value;

upon the content transfer tool receiving a modified hypermedia request:
  connecting to a second information source component;
  retrieving the resulting response from the second information source component;
  and returning the response to the requesting application;

and upon the analysis system determining no modifications to the hypermedia request, retrieving the requested hypermedia from the first information source component and returning the response to the requesting application.

18. The method of claim 17 wherein the modified hypermedia request is performed by modifying one or more user cookies in the hypermedia request.

19. The method of claim 18 wherein the first information source and the second information source are the same web server.

20. The method of claim 19 wherein the content transfer component is a proxy server component.

* * * * *